(12) United States Patent
Last et al.

(10) Patent No.: US 12,060,185 B2
(45) Date of Patent: Aug. 13, 2024

(54) IMPULSE HEAT SEALING OF A HEAT-SEALABLE FILM MATERIAL

(71) Applicant: Scholle IPN IP BV, Tilburg (NL)

(72) Inventors: Laurens Last, Tilburg (NL); Johannes Wilhelmus Van Tuil, Barcelona (ES); Jordi Canada Codina, Barcelona (ES); Jordi Vidal Camps, Barcelona (ES); Juan Rojas Segura, Barcelona (ES); Abel Saez Lopez, Barcelona (ES)

(73) Assignee: SIG SERVICES AG, Neuhausen am Rheinfall (CH)

( * ) Notice: Subject to any disclaimer, the term of this patent is extended or adjusted under 35 U.S.C. 154(b) by 177 days.

(21) Appl. No.: 17/631,443

(22) PCT Filed: Jul. 28, 2020

(86) PCT No.: PCT/EP2020/071306
§ 371 (c)(1),
(2) Date: Jan. 28, 2022

(87) PCT Pub. No.: WO2021/018913
PCT Pub. Date: Feb. 4, 2021

(65) Prior Publication Data
US 2022/0274727 A1 Sep. 1, 2022

(30) Foreign Application Priority Data

Jul. 29, 2019 (NL) ..................................... 2023584
Nov. 22, 2019 (NL) ..................................... 2024295

(51) Int. Cl.
*B65B 51/30* (2006.01)
*B29C 65/00* (2006.01)
(Continued)

(52) U.S. Cl.
CPC .............. *B65B 51/30* (2013.01); *B29C 65/32* (2013.01); *B29C 66/849* (2013.01);
(Continued)

(58) Field of Classification Search
CPC ... B29C 65/32; B29C 66/849; B29C 66/4312; B29C 66/1122; B29C 66/71;
(Continued)

(56) References Cited

U.S. PATENT DOCUMENTS

2018/0250888 A1* 9/2018 Mach .................. B29C 65/3656

FOREIGN PATENT DOCUMENTS

CN 106232327 A 12/2016
EP 0628399 A2 12/1994
(Continued)

*Primary Examiner* — Veronica Martin
(74) *Attorney, Agent, or Firm* — The Watson IP Group, PLC; Jovan N. Jovanovic

(57) ABSTRACT

A sealing station configured to heat seal a wall made from heat-sealable film material, preferably metal-free heat-sealable film material, onto one another wall of heat-sealable material, e.g. another wall of heat-sealable film material, to create a sealed seam. The sealing station comprises an impulse sealing device comprising a first jaw and a second jaw, wherein at least the first jaw comprises at the respective front surface thereof at least one, e.g. a single elongated, impulse heatable member that extends along the respective front surface and that is covered by a heat-resistant non-stick covering.

25 Claims, 14 Drawing Sheets

(51) Int. Cl.
  *B29C 65/32* (2006.01)
  *B65B 51/14* (2006.01)
  *B29L 31/00* (2006.01)

(52) U.S. Cl.
  CPC ........ *B65B 51/146* (2013.01); *B29C 66/4312* (2013.01); *B29L 2031/7128* (2013.01)

(58) Field of Classification Search
  CPC .......... B29C 66/8122; B29C 66/73921; B29C 66/81871; B29C 65/18; B29C 65/3668; B29C 65/7451; B29C 66/72321; B29C 66/81431; B29C 65/3656; B29C 65/368; B29C 66/81427; B29C 66/81457; B29C 66/81811; B29C 66/83543; B29C 66/91421; B65B 51/146; B65B 51/30; B65B 51/227; B65B 9/20; B65B 51/225
  See application file for complete search history.

(56) References Cited

FOREIGN PATENT DOCUMENTS

| | | |
|---|---|---|
| GB | 2566476 A | 3/2019 |
| JP | H092427 A | 1/1997 |

\* cited by examiner

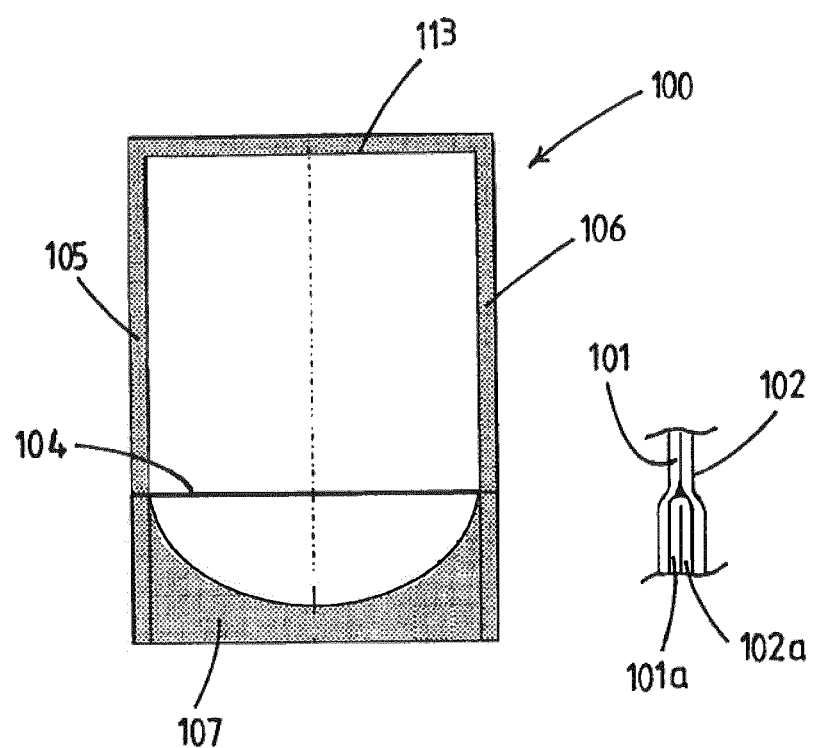

IMPULSE HEAT SEALING OF A HEAT-SEALABLE FILM MATERIAL

The present invention relates to the impulse sealing of two walls made from heat-sealable material, wherein one of said walls is made of heat-sealable film material, preferably metal-free heat-sealable film material. For example, the impulse sealing is used to provide an elongated sealed seam of a collapsible pouch. For example, the elongated seam is a bottom seam, a vertical or side seam, or a top seam of a pouch.

In the field of pouch production, it is known to make use of an impulse sealing device, such as offered by ROPEX Industrie-Elektronik GmbH, Bietigheim-Bissingen, Germany. In known embodiments of such an impulse sealing device, at least one of the jaws has a single, elongated, impulse heatable resistor band that extends along the front surface of the jaw and is covered by a heat-resistant non-stick covering, e.g. a Teflon tape. The device is configured to perform an impulse sealing cycle, wherein the actuator device is configured to bring the first and second jaws into the clamped position, with the two walls of heat sealable film material in between. The sealing device is configured to, in the clamped position, temporarily pass an electric current through the resistor band so as to generate an impulse of heat that is emitted by the resistor band. This brief impulse of heat seals the seam regions of the two walls onto each other. The resistor band cools down after termination of the energizing of the resistor band, assisted therein by operation of the associated cooling device. The actuator device is configured to move the first and second jaws into the opened position after the cooling down has been achieved. The temperature of the resistor band may in practical embodiments increase from room temperature or a slightly elevated temperature extremely fast to 200° C. or much higher temperatures like 300° C., 400° C. or even 500° C., so in general very fast to a very high temperature which is maintained only for a very short duration. The impulse sealing approach is for instance discussed in DE19737471.

The present invention aims to provide measures that provide an improved impulse sealing.

The present invention aims to provide measures that enhance the quality of the seal that is obtained between the seam regions of the walls of heat-sealable material.

The invention provides a sealing station configured to heat seal a wall made from heat-sealable film material, preferably metal-free heat-sealable film material, onto one another wall of heat-sealable material, e.g. another wall of heat-sealable film material, to create a sealed seam, wherein the sealing station comprises:
an impulse sealing device comprising a first jaw and a second jaw,
an actuator device configured to move the first and second jaws relative to one another between an opened position and a clamped position,
a cooling device configured to cool at least one of the first and second jaws,
wherein the first jaw has a first front surface configured to contact an elongated seam region of a respective first wall made from heat-sealable film material,
wherein the second jaw has a second front surface configured to contact an elongated seam region of a respective second wall made from heat-sealable film material,
wherein at least the first jaw comprises at the respective front surface thereof at least one, e.g. a single elongated, impulse heatable member that extends along the respective front surface and that is covered by a heat-resistant non-stick covering,
wherein the sealing station is configured to perform an impulse sealing cycle, wherein the actuator device is configured to bring the first and second jaws into the clamped position, so that the seam regions of the first and second walls are clamped against one another by the first and second jaws, and wherein the sealing station is configured to, in the clamped position, temporarily energize each impulse heatable member so as to generate an impulse of heat that is emitted by each impulse heatable member, which impulse of heat seals the seam regions of the first and second walls to each other, wherein at least one of the first and second jaws is cooled by the cooling device after termination of the energizing of the impulse heatable member, and wherein the actuator device is configured to move the first and second jaws into the opened position after the impulse heatable member has cooled down,
wherein each impulse heatable member is a susceptor element comprising electrically conductive material, said susceptor element having a rear side facing away from the respective front surface,
and wherein at least one of the first and second jaws comprises an inductor that extends along the respective front surface,
and wherein the sealing station comprises a high frequency electric current source, which is connected to the inductor,
wherein the sealing station is configured so that, in the impulse sealing cycle, the electric current source is operated to temporarily feed a high frequency electric current to the inductor, thereby generating a high frequency electromagnetic field with the inductor, wherein the high frequency electromagnetic field induces eddy currents in the susceptor element generating an impulse of heat that is emitted by the susceptor element, which impulse of heat seals the seam regions of the walls to each other.

In an embodiment, both of walls to be joined are made from heat-sealable film material, preferably metal-free heat-sealable film material, e.g. in the production of collapsible pouches or in the production of packaging materials with air-filled pockets.

In another embodiment, one wall is made of heat-sealable film material, whereas the other wall is different with respect to one or more of its flexibility, thickness, manufacturing method, etc. For example, the other wall is a wall of a formed product, e.g. a thermoformed product, for example a plastic tray for packaging of articles, e.g. a plastic food packaging tray, a formed blister packaging component, etc.

In an embodiment, the first jaw is provided with the susceptor element and the second jaw is devoid of a susceptor element, wherein the second jaw is provided with the inductor and the first jaw is devoid of an inductor. In this arrangement the inductor in the second jaw generates a high frequency electromagnetic field that induces alternating eddy currents in the susceptor element of the first jaw, thereby generating an impulse of heat that is emitted by the susceptor element of the first jaw, which impulse of heat seal the seam regions of the walls to each other. An advantage of this design is that the susceptor element can be cooled effectively, e.g. by arranging at least one cooling fluid duct in proximity to the susceptor element, e.g. the cooling fluid duct extends along the rear side of the susceptor element, e.g. parallel to the susceptor element. In this design the second jaw can also be cooled by the cooling device, e.g. by arranging at least one cooling fluid duct in proximity to the inductor, e.g. the cooling fluid duct extends along the elongated inductor section.

In another embodiment, the first jaw also comprises an inductor that extends along the respective front surface, that is electrically insulated from the susceptor element, and that comprises an elongated inductor section at the rear side of the respective at least one susceptor element of the first jaw. In an embodiment, the second jaw may be just a counter member, so devoid of any heating facility. In an embodiment, the second jaw may cooled by the cooling device, e.g. the second jaw having at least one cooling fluid duct. In an embodiment, the first jaw can be cooled by the cooling device, e.g. by arranging at least one cooling fluid duct in proximity to the inductor, e.g. the cooling fluid duct extends along the elongated inductor section.

Due to the extension of the at least one elongated inductor section along the front surface of the jaw, e.g. a rectilinear inductor section, and also along, generally parallel, to the susceptor element, e.g. in an embodiment at the rear side of the at least one susceptor element, preferably in close proximity to said rear side, the development of heat over the extension of the front of the jaw takes place in an attractive manner, in particular in a rather uniform manner. The elongation of the inductor section contributes to the homogeneity of the current density within the inductor section, e.g. compared to a coiled or another rather irregular shape of an inductor section. This homogeneity translates into homogeneity of the high frequency field, and thereby to homogeneity of the impulse heating of the susceptor element. The latter contributes to a reliable and effective heat sealing in the seam regions of the walls of film material.

The homogeneity of the heat sealing and the impulse process allow to have a minimal clamping force of the jaws in the clamped position, e.g. far less than with the traditional continuous heated sealing jaws. The clamping force may effectively only serve to assure an intimate surface contact between the walls.

In an embodiment, the susceptor element is, seen in front view thereon, rectilinear so as to establish a rectilinear heat seal between the walls.

In another embodiment, the susceptor element is, seen in front view thereon, elongated having distinct ends, yet includes one or more curved sections between said distinct ends.

In an embodiment, the elongated inductor section is made from a metal, e.g. of copper.

In embodiments, the at least one elongated inductor section is a solid cross-section metal or other, preferably high conductivity material inductor section, e.g. made of copper which is preferred. This arrangement allows to avoid undue variations of current density within the inductor section, and thereby undesirable variation in the generated field, e.g. compared to an internally hollow inductor section. In alternative embodiment, the at least one elongated inductor section is a multi-strand Litz wire. It has been observed that in such embodiment, heating of the Litz-wire may become problematic and cooling is difficult.

In embodiments, the at least one elongated inductor section has a constant cross-section, preferably a solid cross-section, over its length along the front surface of the respective jaw. This design avoids undue variations of current density within the inductor section, which might otherwise occur at locations where the cross-section changes, and thereby undesirable variation in the generated field.

In embodiments, the uniform cross-section elongated inductor section has, seen in a top view onto the jaw, a shape corresponding to the front surface of the jaw, in embodiments a rectilinear shape, and maintains a uniform distance between the susceptor element and the elongated inductor section. This arrangement enhances uniformity of the development of heat in the susceptor element.

In embodiments, the inductor of a jaw comprises multiple elongated inductor sections that are parallel to one another, e.g. rectilinear elongated inductor sections.

In embodiments, the inductor of a jaw comprises multiple elongated inductor sections that are parallel to one another, e.g. rectilinear elongated inductor sections, and vertically spaced from one another by a slit, e.g. an air slit or a slit filled with electrically insulating material. In embodiments, there is just one pair of elongated inductor sections that are parallel to one another and spaced from one another by a slit. In an embodiment, said single pair of elongated inductor sections is arranged in proximity of the rear side of the susceptor element of the first jaw.

In embodiments, said slit between neighbouring inductor sections, e.g. rectilinear elongated inductor sections, has a height or width between 0.01 mm and 5 mm, more preferably between 0.1 and 2 mm. when the inductor sections are parallel and horizontal, this size relates to the height of the slit, otherwise the width of the slit is envisaged.

In an embodiment, the inductor of the first jaw comprises a pair of parallel inductor sections arranged at the rear side of the susceptor element, e.g. rectilinear elongated inductor sections, e.g. the one inductor section above the other inductor section, spaced from one another by an elongated slit, e.g. an air slit or a slit filled with an electrically insulating material. In practical embodiments, there is just one pair of inductor sections in the first jaw.

The presence of the slit between the parallel elongated inductor sections, e.g. rectilinear elongated inductor sections, allows for a desirable concentration of the field that is generated by the inductor of the jaw. In an embodiment, the susceptor element extends, seen in a view onto the front surface of the jaw, over a slit between parallel inductor sections.

In an embodiment, the susceptor element, seen in a view onto the front of the jaw, extends over the slit between parallel elongated inductor sections and overlaps in said view with each of the parallel inductor sections. In an embodiment, the susceptor element overlaps the entire inductor sections. In another embodiment, the amount of overlap between the susceptor element and each of the parallel inductor sections is limited. The height, and length, of the susceptor element is generally chosen in accordance with the seal to be made.

In an embodiment, the susceptor element is embodied as one strip that extends over the slit between parallel elongated inductor sections, e.g. rectilinear elongated inductor sections, and overlaps in said view with each of the parallel inductor section.

With the strip-like susceptor element extending over the slit, the vast majority of the field generated by the inductor will be concentrated in the susceptor element.

In an embodiment, a strip shaped susceptor element has opposed edges, e.g. an upper edge and a lower edge, defining a height or width of the strip, wherein the height or width of the strip is at least 50% of the height or width of the single pair of inductor sections including the slit that are arranged at the rear of the strip, e.g. between 75% and 125% of said height or width, e.g. about 100% of said height or width.

In an embodiment, a strip shaped susceptor element has opposed edges, e.g. an upper edge and a lower edge defining a height of the strip, wherein the inductor of a jaw comprises a number of, e.g. multiple, e.g. two or more than two, inductor sections, e.g. rectilinear elongated inductor sections. Herein the height or width of the strip is preferably at most the same as the height or width of the number of one or more inductor sections, preferably the edges of the strip not protruding outside the height or width of the assembly of the one or more inductor sections.

In an embodiment, the inductor of a jaw is embodied so that in a pair of adjacent and parallel inductor sections, e.g. that are arranged at the rear side of the susceptor element, e.g. rectilinear elongated inductor sections, the current flows in the same direction through the inductor sections.

In an embodiment, the inductor of a jaw is embodied so that in a pair of adjacent and parallel inductor sections, e.g. that are arranged at the rear side of the susceptor element, e.g. rectilinear elongated inductor sections, the current flows in opposite directions through the inductor sections.

In an embodiment, the inductor of a jaw comprises a C-shaped inductor element having parallel first and second inductor sections, e.g. rectilinear elongated inductor sections, interconnected, e.g. by a bent portion, in series, wherein the free ends of the inductor sections have terminals for electrical connection to the current source.

In an embodiment, the inductor of a jaw comprises multiple nested C-shaped inductor elements, each having parallel first and second inductor sections interconnected in series, e.g. by a bent portion, wherein the free ends of these inductor sections have terminals for electrical connection to the current source. For example, the inductor has two nested C-shaped inductor elements.

In an embodiment, the first and/or second jaw is provided with one C-shaped inductor element, having parallel first and second inductor sections interconnected in series, e.g. rectilinear elongated inductor sections, wherein the free ends of the inductor sections have terminals for electrical connection to the current source.

In an embodiment, the inductor of a jaw comprises a C-shaped inductor element having parallel first and second inductor sections interconnected in series and arranged adjacent, e.g. above one another, wherein the inductor sections are separated by a slit, e.g. an air slit or a slit filled with electrically insulating material.

In an embodiment, the inductor of a jaw comprises multiple, e.g. just two or four or six, elongated inductor sections arranged parallel to one another, e.g. rectilinear inductor sections, and arranged alongside, e.g. above, one another behind the susceptor element.

In an embodiment, the inductor of the first jaw comprises multiple inductor sections arranged parallel to one another and arranged above one another behind the susceptor element, e.g. rectilinear elongated inductor sections.

In an embodiment, the inductor of a jaw has an inductor element that is generally U-shaped seen from above, wherein each of the first and second elongated inductor sections thereof has a constant cross-section, preferably a solid cross-section, over its length.

In an embodiment the at least one elongated inductor section, e.g. rectilinear elongated inductor section, has a thickness of between 1.0 mm and 4.0 mm, seen perpendicular to the front surface of the jaw, for example between 1.5 mm and 3.0 mm. The limited thickness of the inductor element enhances the cooling of the jaw, including the inductor of the jaw, e.g. as one or more cooling fluid ducts are preferably arranged in proximity of a rear side of the at least one inductor element.

In an embodiment the at least one elongated inductor section, e.g. rectilinear elongated inductor sections, has a rectangular cross-section with a height or width that is greater than the thickness of the inductor section. This arrangement allows to limit the thickness, which allows for efficient cooling.

At least one, preferably each, jaw may be provided with one or more cooling fluid ducts, e.g. the cooling fluid being a cooling liquid, e.g. water, being passed through the cooling fluid ducts, e.g. using a pump assembly, e.g. a cooling liquid circuit being a closed circuit including a heat exchanger configured to remove heat from the cooling liquid.

In an embodiment, or in combination with cooling by means of cooling liquid, air cooling can be employed for one or both of the jaws. Yet, due to the capacity, cooling by means of cooling liquid is preferred. Preferably, the cooling liquid is passed in close proximity to the inductor of a jaw, e.g. directly behind the one or more elongated inductor sections. Preferably, no cooling fluid is passed in a region between the inductor and the susceptor element as that would unduly increase the distance between them and would impair effectivity of the impulse heating induced by the field. It will be appreciated, that in view of the desired very close proximity of the susceptor element to the front surface of the jaw, there is in practice no space for any cooling duct in said region. So, in practical embodiments, cooling of the jaw is preferably done using a control flow of cooling fluid, e.g. liquid, through one or more ducts that are arranged behind, and preferably in close proximity to, the inductor sections and/or the susceptor element.

In an embodiment, at least one cooling fluid duct extends along the at least one inductor section that extends along the rear side of the susceptor element.

It is preferred for the sealing device to be configured such that cooling is active during the entire impulse sealing cycle, so also during the creation of the heat impulse which happens so fast that it is generally not impaired by the cooling. In another configuration the cooling may be interrupted or reduced around the moment of the heat impulse.

The cooling device may, as preferred, be configured to cause cooling of the heat-sealed seam region before the jaws are opened, e.g. the film material being cooled to below 60° C. before opening, e.g. to below 40° C.

The cooling of the jaws may, as preferred, be configured to cause cooling of the heat-sealed region before the jaws are opened, e.g. the film material being cooled to below the crystallization temperature of the polymer material involved in the join.

A benefit of the cooling is that, before the release from the jaws, the sealed region of the pouch will acquire a strength and rigidity that is greater than in absence of such cooling. This, for instance, may allow for an increased production speed of the machine wherein higher forces may be exerted on the walls, e.g. in view of transport of a pouch or string of interconnected pouches through a pouch production machine. Undue stretching of the pouch, e.g. in the area of the fitment seal, is preventable to a large degree by use of the invention disclosed herein.

In an embodiment, the susceptor element is made of metal material, e.g. a metal or a metal alloy, e.g. of a thin metal strip.

For example, the susceptor element is made of, or comprises, aluminium, nickel, silver, stainless steel, molybdenum and/or nickel-chrome.

In an embodiment, the susceptor element is embodied as a strip having opposed front and rear main faces that define the thickness of the strip between them. In an embodiment, the thickness of the susceptor element strip is constant over the extension of the strip.

In embodiments, the thickness of the susceptor element may differ locally from a nominal thickness. For example, the susceptor element may comprise a thickened portion at its rear surface, e.g. facing away from the front surface of the jaw, to locally increase the intensity of the electromagnetic field in the susceptor element, in order to locally increase the intensity of the heat impulse that is emitted by the susceptor element.

In an embodiment, the susceptor element is embodied as a planar strip, most preferably the first jaw having a single planar strip susceptor element. This arrangement as a planar strip is in particular preferred. Herein, preferably, the plane of the susceptor element is parallel to the plane of seam regions to be joined.

The front of the jaw equipped with the susceptor element, possibly both jaws being equipped with a susceptor element and an associated inductor, is preferably smooth, so devoid of any relief that locally holds the wall of film material away from the jaw and creates air pockets between the jaw and the walls of film material. This smooth design causes a very effective transfer of the heat impulse from the jaw to the zone where the joint is made. In practice it can be observed that a joint is achieved through the entirety of the area where the susceptor emits heat towards the walls of film material clamped onto one another in the seam regions.

In an embodiment, the susceptor element comprises a paramagnetic material, a diamagnetic material, or a ferromagnetic material. Such magnetic materials may be effected by an electromagnetic field, in order to achieve eddy currents that cause the mentioned rapid heating in the impulse sealing technique.

In an embodiment, the susceptor element is a strip, e.g. of a metal, e.g. of aluminium, wherein the height of the strip is between 3 and 40 millimetres, e.g. between 10 and 30 mm. For example, as preferred, the strip has a constant height over its length.

In an alternative embodiment, the height of the susceptor element may be non-constant. For example, a lower edge of a susceptor element in a jaw of a fitment sealing station may be upwardly curved in a central, e.g. at a part that is configured to abut an attachment portion of a fitment during use, to effect that lees heat is transferred to a lower edge of the attachment portion and the air below. This improves the rate at which the seal can be cooled, since the air would otherwise act as an insulator, e.g. reducing the cooling rate.

Preferably, the susceptor element strip lacks apertures over its extension.

In an embodiment, the jaw is provided with a single continuous susceptor element embodied as a strip, e.g. of metal.

In an embodiment, the susceptor element, e.g. embodied as a strip, has a thickness of between 0.01 and 5 mm, preferably between 0.05 and 2 mm, more preferably between 0.08 and 0.8 mm, e.g. of between 0.08 and 0.5 mm. In general, it is considered desirable to have a minimum thickness of the susceptor element in view of the desire to rapid cool the jaw, e.g. including the inductor and the susceptor, after termination of the heat impulse. A thin design of the susceptor, contributes to this desire. It is noted that, in contrast to the impulse sealing device addressed in the introduction, no electric current from a current source is passed through the susceptor, so the cross-section need not be designed to deal with such a current flow.

In an embodiment, the first jaw is provided with a single continuous susceptor element embodied as a strip, e.g. of metal, having a height or width of the strip between 3 and 40 mm, e.g. between 10 and 30 mm, e.g. of 25 millimetres, and a thickness of between 0.08 and 0.8 mm, e.g. of between 0.08 and 0.5 mm. For example, the strip is made of aluminium or nickel material.

In embodiments, each jaw has its inductor is connected to its own associated electric current source, e.g. allowing for individual control of the current supply to the respective inductor and thus the heating of the susceptor element of the jaw.

In embodiments, the sealing device is configured to effect the heat impulses emitted by the two opposed jaws in an asynchronous or alternating manner relative to one another. For example, first the one jaw is energized to create a heat impulse and then the second jaw is energized to create heat impulse. This may allow for enhanced control of the input of heat into the walls. Of course, it is also envisaged, and considered practical, to operate the jaws so that they emit heat impulses in a synchronous manner.

In embodiments, the frequency of the alternating electric current supplied to the inductor is between 100 kHz and 1 MHz, for example between 250 KHz and 750 KHz.

In embodiments, the magnitude of the electric current supplied to the inductor is between 20 A and 600 A.

In embodiment, the electric current is supplied to the inductor at a voltage with a magnitude between 40 V and 500 V.

In an embodiment, the sealing device is embodied such that the high frequency electromagnetic field generated by the inductor primarily causes the very rapid development of heat within a frontal skin layer of the susceptor element due to the so-called skin effect. The skin effect is the tendency of an alternating electric current to become distributed within a conductor such that the current density is largest near the surface of the conductor and decreases, exponentially, with greater depths of the conductor. At high frequencies the skin depth becomes smaller. This depth may, for example, be 0.15 mm for an aluminium susceptor element if the frequency of the field is 350 KHz. The thickness of the susceptor element is envisaged to be more than this skin depth, yet not too much for the reason addressed herein.

In particular for sealing a seam extending across a gusset portion, in particular across the so-called triple point associated with the presence of a gusset portion, e.g. in a gusset bottom type or gusset side collapsible pouch, it can be advantageous to provide a resilient backing layer behind the susceptor element, thereby allowing for the jaw front to accommodate for a local variation of the number of walls, e.g. of film material walls, in the area of the seam to be made. As known in the art of pouch production the triple point is where there are two walls to be joined on one side of the point, and wherein there are two pairs of two wall segments (so four wall thicknesses in total) to be joined on the other side of the triple point. See for instance WO2013/066328. For example, in an embodiment, a silicone rubber layer or a Teflon layer is provided behind the susceptor element. For example, the resilient layer has a thickness between 0.1 and 2.0 millimeter. Herein it is understood that the thin susceptor element is able to flex so as to accommodate the local variation in the number of walls.

The provision of a resilient backing layer is preferably not done, so a resilient backing is preferably absent, unless truly required. This is in view of the thermal insulating effect provided by such an additional layer which may hamper the cooling action of the cooling device. Also the additional layer may increase the spacing between the inductor section and the susceptor element in an undesirable manner.

In an embodiment, the elongated inductor section is arranged at the rear of the susceptor element in the first jaw, possibly the second jaw being of similar design, wherein the spacing between the rear of the susceptor element and the neighbouring inductor section(s) is at a minimum 0.025 mm, or 0.05 mm, or 0.1 mm and at a maximum 3.0 mm, or 2.0 mm, or 1.0 mm. The minimum values of this spacing are primarily envisaged to allow for effective electrical insulation between the inductor section(s) on the one hand and the susceptor element on the other hand. In embodiments, it is envisaged that this spacing is only filled with electrically insulating material. The maximum value of this spacing is primarily envisaged to have the inductor section(s) in close proximity to the rear of the susceptor element, wherein a maximum of 1.0 mm is preferred. In a practical embodiment this spacing may be 0.05 mm. So this spacing may in practical embodiments be less than the thickness of the susceptor element itself.

Preferably, the entire spacing between the rear of the susceptor element and the neighbouring inductor section(s) is filled with electrically insulating material.

In an embodiment, the spacing between the rear of the susceptor element and the neighbouring inductor section is filled with multiple layers of electrically insulating material, e.g. tape, for example at least a layer of Kapton tape and a layer of Teflon tape, for each just one layer of Kapton tape and one Layer of Teflon tape.

In an embodiment the electrical insulation between the rear of the susceptor element and the neighbouring inductor section(s) has a thickness of between a minimum of 0.025, or 0.050, or 0.1 mm, and a maximum of at most 3.0 mm, or 2.0 mm.

In an embodiment the anti-stick layer at the front of the jaw is embodied as a layer of Teflon tape. In another embodiment the anti-stick layer could comprises glass or the like.

In an embodiment the front face of the susceptor element is covered by a layer of electrically insulating material, e.g. tape, e.g. Kapton tape, e.g. having a thickness of between 0.01 and 0.05 mm, e.g. of about 0.025 mm.

In an embodiment the spacing between the front surface of the jaw and the susceptor element is at a minimum 0.025 mm, or 0.050 mm, and at a maximum 2.0 mm, or 1.0 mm, or 0.5 mm. Herein, the minimum spacing may be governed by the presence of an anti-stick layer. The anti-stick layer can be coated onto the jaw, e.g. onto the susceptor element, e.g. a glass or Teflon coating.

In an embodiment the spacing between the front surface of the jaw and the susceptor element is filled with one or more layers of electrically insulating material, e.g. tape, for example at least a layer of Kapton tape and a layer of Teflon tape as anti-stick layer forming the front surface of the jaw, for each just one layer of Kapton tape and one Layer of Teflon tape.

In an embodiment, the front surface of the jaw having the susceptor element, is smooth in a region of contact with the wall of film material, so lacking or devoid of any relief that would locally keep the film material away from the front surface, so lacking for example one or more ribs, bosses, etc.

In embodiments, one or both jaws have a main body, e.g. of plastic or ceramic material, e.g. a heat-resistant material, e.g. of PEEK, on which the susceptor element and/or the inductor are mounted. The plastic or ceramic material is selected to not impair the field that is generate by the inductor, at least not in an undesirable manner. Boron nitride and/or Aluminium nitride, Polyphenylene sulphide, vulcanized silicone materials can be considered as well for the main body. In particular Boron nitride provides for a good thermal conductivity, thereby enabling a good conductivity of heat from the susceptor element and the inductor towards the cooling device, e.g. towards the cooling fluid, e.g. water, circulated through duct(s) in the main body.

The main body can be 3D-printed if desired.

For example, the one or more cooling ducts are provided, e.g. machined, in the main body.

For example, one or more cooling ducts extend generally in parallel to the one or more inductor sections, e.g. one duct behind each inductor sections.

For example, one or both jaws have a main body, e.g. of plastic or ceramic material, having a main body front side into which one or more grooves are made in which the one or more induction sections are arranged. In embodiments the susceptor element is arranged over the main body front side, as discussed herein relative to the one or more inductor sections. Herein, one or more layers of electrically insulation material are arranged between the inductor section(s) and the susceptor elements, e.g. of Kapton and/or Teflon. One or more further layers of electrically insulation material as well as an outer anti-stick covering are mounted over the susceptor element to from the front surface of the jaw.

In embodiment, the sealing device is configured to provide a heat impulse with the susceptor element of between at least 150° C. and at most any of 200° C., 300° C., 400° C., or 500° C. measured on the susceptor.

In an embodiment, the heat impulse duration lies between 10 and 1000 milliseconds, e.g. between 20 and 500 milliseconds, e.g. between 75 and 400 milliseconds.

In an embodiment the cycle includes a clamped cooling phase directly following the heat impulse during which the jaws are maintained in clamped position, which clamped cooling phase may have a duration between 200 and 800 milliseconds, e.g. between 300 and 600 milliseconds. In practical embodiments, the clamped cooling phase may be longer than the heat impulse as cooling is slowed down by the thermal insulating properties of plastic materials.

It is noted that control of the temperature that is reached during the impulse heating may be done on the basis of monitoring and controlling the supply of electrical power to the inductor and/or by monitoring and controlling the temperature and/or flow rate of cooling fluid. e.g. water, circulated along the respective jaw.

In an embodiment wherein both the first jaw and the second jaw of a sealing device each comprises a susceptor element and an inductor, it is primarily envisaged that both jaws are operated simultaneously to provide a heat impulse to the region to be joined.

In an alternative operational method, it is envisaged that the jaws of a sealing device each comprises a susceptor element and an inductor, and that the jaws are operated in alternating manner, so the first jaw sealing a first seam region in a first cycle and the second jaw sealing a second seam in a second cycle. This approach may allow for a relatively long cooling period of the jaw before the inductor of the jaw is energized again.

The provision of the induction impulse heatable member may provide that the start-up time, e.g. the time wherein the sealing station can become operable from an inactive state, is fairly limited. Compared to the known sealing stations with continuously-heated jaws, it is not necessary to slowly bring the jaws towards the sealing temperature, which required up to 30 minutes in the known sealing stations. Instead, start-up of the innovative system can take only between 1 and 2 minutes, for example after the sealing station has been adjusted to make a different type of seal, e.g. a different packaging.

In an embodiment, the sealing device, e.g. a control unit thereof, is configured to effect a preheating of the susceptor element before the actual impulse heat sealing is carried out. For example, the susceptor element is preheated to a preheating temperature of between 50 and 120 degrees Celsius, e.g. between 60 and 80 degrees Celsius, before the heat impulse is carried out at a higher temperature of the susceptor element. The preheating may take place at a preheating temperature that is preferably low enough to prevent the film material to be significantly influenced. At the same time, the preheating reduces the difference in temperature between that of the susceptor, prior to the heat impulse, and the desired temperature of the susceptor during the heat impulse. The reduced temperature difference provides that the peak temperature during the heat impulse may be reached in less time and that the high frequency electromagnetic field only needs to be provided for a shorter period of time. As such, the required time for the heat sealing may be reduced, resulting in an increased production rate. Furthermore, the shorter heat impulse time may serve to avoid a risk of damaging the film material.

In a further embodiment, the sealing device, e.g. a control unit thereof, is configured to control preheating of the susceptor element before the jaws are brought in the clamped position. In another embodiment, preheating is done whilst the jaws are in the clamped position.

In an embodiment, the sealing device is configured to energize each impulse heatable member in several periods, e.g. each period at a predefined intensity, during a single impulse sealing cycle whilst the seam regions of the first and second walls are clamped against one another by the first and second jaws. Herein, for example, a first period of energizing may be done to effect a preheating and a subsequent second period of energizing may be done to effect the heat sealing proper of the seam regions of the first and second walls. For example, the sealing device is configured to energize each impulse heatable member at different intensities during timed periods of the impulse sealing cycle. For example, during a first period a first current is passed through the inductor and during a second period a second, e.g. higher, current is passed through the inductor. For example, a non-energizing period, e.g. wherein no relevant current is passed through the inductor, is present between two periods of energizing the impulse heatable member. For example, instead of one continuous period of energizing the impulse heatable member, e.g. having a duration of 300 milliseconds, a first period of 100 millisecond energizing the impulse heatable member is followed by a non-energizing period of 50 milliseconds, followed by 150 milliseconds of energizing at a higher intensity than during the first period.

In an embodiment, the sealing device is configured to create a bottom gusset seal in a W-shaped bottom gusset pouch. Herein the sealing device is embodied to establish a seal between a first pouch wall made from heat-sealable film material and a first gusset portion that is directly inward thereof and a seal between an opposed second pouch wall made from heat-sealable film material and a second gusset portion that is directly inward thereof, said first and second gusset portions being interconnected via an inner fold line.

The sealing device according to this embodiment may provide that the entire bottom gusset seal of the pouch may be established with only a single heat impulse, providing for a fast and reliable sealing of the bottom gusset.

In an embodiment, the susceptor element is a plate-shaped susceptor element, which defines the front surface of the respective jaw, having a width that substantially corresponds to a width of the bottom gusset pouch, and wherein the inductor has a width that is larger than the width of the bottom gusset pouch. As such, the resulting seal that is created by means of the sealing device has a shape that corresponds to the portion of the susceptor element that comes in contact with the film material of the pouch wall.

The width of the susceptor element corresponds to the width of the pouch, to effect that the entire bottom gusset region of the pouch, spanning across its entire width, can be sealed by the sealing device with only a single heat impulse. The inductor may, with its large width, project beyond the contour of the pouch and beyond the contour of the susceptor element. This wide inductor may provide that, at least in the susceptor element, the electromagnetic field is substantially homogeneous.

In an embodiment, at least during the heat impulse, the susceptor element projects within opposing side edges of the pouch. The susceptor element thereby does not project beyond the outer contour of the pouch, e.g. at least not beyond both side edges of an individual pouch. Since the heat impulse is only effected in the susceptor element, only the part of the pouch covered by the susceptor element will be sealed by means of the heat impulse. Accordingly, when the susceptor element does not project beyond the side edges of the pouch, a single heat impulse will only seal a single pouch and will not result in sealing of adjacent pouches that are located next to the pouch that is intended to be sealed, in particular not of adjacent pouches in a string of interconnected pouches.

In an embodiment, the susceptor element has, seen in a front view on its front surface, an upper edge that defines a concave shape. The concave shape has a relatively high profile at opposing side edges and has a relatively low profile at a central portion in between the side edges. As such, the created bottom gusset seal is relatively high at the side edges of the pouch, preferably also extending across the triple point of the pouch, whereas the seal is relatively low in between the side edges of the pouch. As such, the bottom gusset pouch may provide for relatively large internal volume, while still allowing the pouch to stand firmly on the bottom gusset and allowing the pouch to have an appealing aesthetic appearance, once filled with a liquid.

In an embodiment, the inductor has a corresponding concave shape, comprising a pair of elongated curved inductor sections that are parallel to one another and spaced from one another by a slit. As such, the curved inductor sections follow the upper edge of the susceptor element, in order to provide for a homogeneous electromagnetic field in the upper region of the susceptor element, e.g. along the concave upper edge thereof.

In an embodiment, a concave upper edge of the inductor follows the concave upper edge of the susceptor element and/or the inductor projects beyond opposing side edges of the susceptor element. This relative orientation between the inductor and the susceptor element may provide that the electromagnetic field in the susceptor element, and accordingly the generated heat impulse therein, has desirable properties, for example being homogeneous over the entire susceptor element.

In an embodiment, the production machine comprises at least one temperature sensor configured to sense the actual temperature of a jaw, e.g. of a front surface of the jaw, e.g.

of the susceptor element of the jaw, e.g. of the main body, which temperature sensor is linked to a control unit of the current source. Herein the control unit, e.g. computerized, is configured to adjust the current that is fed to the inductor on the basis of the output of the temperature sensor. For example, the current source is adjusted with respect to a preheating of the jaws and/or the impulse heating. Alternatively or additionally, the control unit, e.g. computerized, is configured to adjust the temperature and/or flow rate of cooling fluid circulated along the respective jaw on the basis of the output of the temperature sensor. For example, the cooling device is adjusted with respect to a preheating of the jaws and/or the impulse heating.

The controlling may take place via a feedback-type control mechanism, such that measured values during a first sealing cycle forms the basis for controlling the current source and/or cooling device, in order to influence the impulse heating and/or cooling for subsequent sealing cycles.

In an embodiment, the control unit may be configured to log during production one or more sealing parameters in relation to the produced products, e.g. pouches, such as one or more actual settings of the current source and/or the cooling device, in order to be able to retrieve afterwards which seal, e.g. of which pouch, has been made at which specific setting(s). This may contribute to the monitoring of the quality of the seals that are being made.

In an embodiment, the temperature sensor is configured and used to measure the temperature of at least one of the jaws in a phase of the cycle that is distinct from the heat impulse phase itself. For example, the temperature is measured when the jaws are in their opened position. For example, the temperature sensor is a contactless temperature sensor, e.g. aimed at the front surface of a jaw.

In an embodiment, a temperature measurement performed during one or more impulse sealing cycles, is used to adjust the current source for performance of one or more subsequent impulse sealing cycles.

For example, the temperature measurement is used to control the current source in view of performing a preheating of the one or more jaws, e.g. to guarantee a constant preheated temperature of the one or more jaws ahead of a subsequent period of energization to effect the heat sealing proper. So, for example, if the temperature measurement detects a slow rise of the temperature of the jaws at the end of the cycle(s), the preheating is then reduced so as to avoid a too high preheated temperature, e.g. in view of having a constant preheating temperature.

The sealing device is primarily envisaged for sealing of metal-free film material. For example, the film material of the first wall, or of both walls, is a multi-layer material where one and the same plastic, but with different properties, is found in all layers. In another embodiment the wall is a monolayer wall. The absence of a metal layer allows for more effective recycling.

In an embodiment, the film material, preferably metal-free film material, comprises one or more layers each comprising or consisting of polyethylene (PE), for example high-density polyethylene (HDPE) or low-density polyethylene (LDPE), and/or polypropylene (PP), and/or polyethylene terephthalate (PET). The film material may thereby comprise a mixture of two or more of these polymers, a laminate with one or more layers each consisting of one or more polymers, or a single layer with a single one of these polymers. These polymers may have different properties, for example in terms of mechanical strength and/or sealing capabilities, which may all be used to obtain a suitable material.

In an embodiment, the film material is made entirely from polyethylene (PE), for example high-density polyethylene (HDPE) or low-density polyethylene (LDPE), polypropylene (PP), or polyethylene terephthalate (PET). According to this embodiment, the film material consists of a single type of polymer, e.g. a mono-material, which may optionally allow the film material to consist of a single polymeric layer. The use of only a single polymer may improve the recyclability of the pouch, since it may no longer be required to separate the various polymers, since the wall only comprises a single polymer. Also any metal layer is absent.

In an embodiment, the film material includes a layer of Ethylene vinyl alcohol (EVOH) as an oxygen barrier, e.g. for food packaging, e.g. as a substitute for a metal layer in the film which is preferably absent. A film material with a single type of polymer as defined above may still comprise a certain amount of EVOH, typically up to 5 wt %, whilst still being characterized as a mono-material.

Generally, the use of only a single synthetic polymer type in the film material places significant demands on the sealing device and operation thereof, compared to situations wherein the film material contains a robust layer, e.g. a metal layer and/or PET that is far less susceptible to local overheating than other common plastic materials. In particular, it is even desirable to dispense with both metal and PET in the film material, leaving the industry with PE and PP which are relatively hard to heat seal at high speeds due to their susceptibility to variations in the heat sealing process and/or their reduction in (tensile) strength due to the local heating of the material. For example, such local heating causes a drop in tensile strength, which may be problematic in view of tensile forces acting on the material during the advance thereof past the sealing device and/or other stations of the pouchmaking machine.

In an embodiment, the film material is printed, e.g. a surface print being provided on the side that is contacted by a jaw of the sealing station having a susceptor and inductor. The impulse sealing does not impair the quality of the surface print in contrast to the use of continuously heated seal jaws. In an embodiment, the film material is subjected to inline surface printing of the film material, e.g. just prior to the sealing as disclosed herein.

In an embodiment, a conveyance mechanism is provided that is configured to convey the walls to be sealed, e.g. individual pouches or a string of interconnected pouches having heat-sealable film material walls, along a path of conveyance, wherein the sealing station as discussed herein is arranged along said path of conveyance. In an embodiment, the conveyance mechanism is configured and operated to convey in an intermittent motion pattern, so stepwise. Often, in pouch production, a so-called walking beam conveyance mechanism is employed for stepwise conveyance. The sealing action is then performed with the walls to be joined, e.g. the pouch, at rest, in practical embodiments with the sealing station mounted stationary in a machine, at least with regards to the direction of conveyance.

In an embodiment, the conveyance mechanism is configured and operated to convey the walls to be joined, e.g. of individual pouches or of a string of interconnected pouches, along a path of conveyance in a continuous motion, so without stopping and starting. Herein it is envisaged that the sealing station comprises a motion device that is configured to move a pair of jaws in synchronicity with the continuously moving walls to be joined during the impulse sealing cycle. An advantage of this approach that undesirable deformations of the walls, e.g. of the pouch, are avoided, which would otherwise result from rapid stopping and starting. For example, the sealing station comprises an endless motion device wherein one or more, preferably multiple, sealing devices are moved along an endless path that extends over a segment thereof along the path of conveyance.

In the continuous motion device it is preferred for the cooling device to be embodied such that continuous circulation of coolant. e.g. cold water, through the one or more cooling ducts in the jaws can be established. This may entail the use of one or more rotary couplings to connect, for example, one or more hoses to the jaws via the one or more rotary couplings to a stationary mounted pumping and heat exchanger system. One or more flexible coolant hoses may be arranged between each of the mobile, e.g. reciprocating, jaws on the one hand and a stationary mounted pumping and heat exchanger system on the other hand.

The sealing device as discussed herein may form part of a production machine for the production of collapsible pouches, e.g. spouted collapsible pouches or collapsible pouches with another type of fitment or pouches lacking a fitment, said pouches each having walls made from heat-sealable film material, preferably metal-free heat-sealable film material.

The present invention also relates to a production machine for the production of collapsible pouches, said pouches each having walls made from heat-sealable film material, preferably metal-free heat-sealable film material, wherein the production machine comprises a sealing station that is configured to heat seal the walls onto one another to create a sealed seam of the pouch, wherein the sealing station comprises:
an impulse sealing device comprising a first jaw and a second jaw,
an actuator device configured to move the first and second jaws relative to one another between an opened position and a clamped position,
a cooling device configured to cool at least one of the first and second jaws,
wherein the first jaw has a first front surface configured to contact an elongated seam region of a respective first wall of the pouch,
wherein the second jaw has a second front surface configured to contact an elongated seam region of a respective second wall of the pouch,
wherein at least the first jaw comprises at the respective front surface thereof at least one, e.g. a single elongated, impulse heatable member that extends along the respective front surface and that is covered by a heat-resistant non-stick covering,
wherein the sealing station is configured to perform an impulse sealing cycle, wherein the actuator device is configured to bring the first and second jaws into the clamped position, so that the seam regions of the first and second walls are clamped against one another by the first and second jaws, and wherein the sealing station is configured to, in the clamped position, temporarily energize each impulse heatable member so as to generate an impulse of heat that is emitted by each impulse heatable member, which impulse of heat seals the seam regions of the first and second walls to each other, wherein at least one of the first and second jaws is cooled by the cooling device after termination of the energizing of the impulse heatable member, and wherein the actuator device is configured to move the first and second jaws into the opened position after the impulse heatable member has cooled down,
wherein each impulse heatable member is a susceptor element comprising electrically conductive material, said susceptor element having a rear side facing away from the respective front surface,
and wherein at least one of the first and second jaws comprises an inductor that extends along the respective front surface, wherein, preferably, the first jaw comprises an inductor that extends along the respective front surface,
wherein the inductor is electrically insulated from the susceptor element, and wherein the inductor comprises an elongated inductor section at the rear side of the respective at least one susceptor element,
and wherein the sealing station comprises a high frequency electric current source, which is connected to the inductor,
wherein the sealing station is configured so that, in the impulse sealing cycle, the electric current source is operated to temporarily feed a high frequency electric current to the inductor, thereby generating a high frequency electromagnetic field with the inductor, wherein the high frequency electromagnetic field induces alternating eddy currents in the susceptor element generating an impulse of heat that is emitted by the susceptor element, which impulse of heat seal the seam regions of the walls to each other.

In an embodiment, the production machine further comprises one or more of:
a roll handling station adapted to receive one or more rolls of heat-sealable film material,
one or more pouch forming stations adapted and operated to form the film material dispensed by the roll handling station into a succession of pouches, e.g. distinct pouches or a string of interconnected pouches,
for example a pouch forming station being embodied as a folding station, e.g. to fold film material dispensed from a single roll into a shape with a bottom gusset, for example a pouch forming station being embodied as a cutting station, e.g. to make one or more cuts to shape and/or separate, e.g. in part, the pouches,
a fitment, e.g. spout, inserting device adapted to insert an attachment portion of a fitment in a non-bonded edge region,
a fitment sealing device,
a feed mechanism adapted and operated to feed said formed pouches, e.g. separate or as a string of interconnected pouches, e.g. to the fitment inserting device and the fitment sealing device, which devices may be located at one at the same station,
a fitment feeder adapted and operated to feed fitments to the fitment inserting device.

In embodiments, the machine is configured for production of pouches having one or more gussets, e.g. in a side and/or in a bottom of the pouch, e.g. with a fitment, e.g. a spout, being heat sealed between the walls at the top of the pouch. In embodiments, the spout is provided with a closure, e.g. a cap, e.g. a screw cap, a flip-top cap, and/or with a valve, e.g. a slit valve, a bidon type valve, etc.

In embodiments, the machine comprises a filling station, configured to fill a product into the pouch.

In an embodiment, the filling station is configured to fill the product into the pouch prior to the sealing the opening in the pouch, e.g. a non-bonded edge of the pouch using a sealing device. The filling can also, for example, be performed via a non-bonded edge region into which a fitment, e.g. a spout, is sealed at a later stage.

For example, the filling is done via a spout of the pouch, e.g. in an aseptic filling device, optionally followed by a closing step wherein the spout is closed, e.g. in a capping station provided with a capping device configured and operated to place a cap on the spout.

In an embodiment, a pre-made spout supplied to a spout inserter device is part of a pre-made spout-closure assembly comprising the spout and a closure member closing said spout, so that after performing the sealing step(s) that secures the spout and closes the edge region and any additional sealing of all non-bonded regions a hermetically closed pouch is obtained. In an embodiment, this pouch is then empty. For example, the hermetically closed, still empty pouch, is then transferred to a remote filling device, where a product is filled into the pouch via the spout, e.g. in an aseptic filling device, wherein the filling device removes or opens the closure member, fills the product into the pouch, followed by a closing step wherein the spout is closed, e.g. by moving the closure member into a closed position thereof, e.g. replacing the closure member back onto the spout, or by replacing the removed closure member by another closure member, e.g. in a capping station provided with a capping device configured and operated to place a cap on the spout.

In an embodiment, the machine comprises a film material sterilization station that is configured to subject the film material dispensed from the one or more rolls to a sterilization process. In an embodiment, the machine is provided with a sterile or aseptic chamber that extends from said film material sterilization station onwards until and including the sealing station, preferably also any further sealing station, so that the formation of a hermetically closed pouch is performed in said sterile or aseptic chamber. The inventive sealing station, e.g. using continuous cooling of the jaw(s), can be relatively small.

It is observed that the jaw(s) of the inventive sealing station require relatively little cleaning of any contaminants on the front face, allowing placement of the jaw in the sterile or aseptic chamber without undue need for access in view of cleaning.

In an embodiment, a filling station is arranged in along said sterile or aseptic chamber, so that both the production of the pouch and the filling of the pouch, and preferably also the hermetic sealing of the pouch (e.g. by provision of the spout, possible already closed or possibly closed by a later capping action) is done within the one sterile or aseptic chamber.

In an embodiment, the production machine comprises one or more additional sealing devices in order to seal the walls of film material in other regions in order to produce the pouches. This is commonly known in the art.

For example, the sealing device discussed herein is configured to establish a side or vertical seal of the pouch, e.g. side seals along opposite vertical sides of the pouch, e.g. in a horizontal form-fill-seal machine. For example, the sealing device is configured to establish a side seal in a bottom gusset pouch, with said sealing seam extending across the triple point where the top of the gusseted portion adjoins the side of the pouch.

In an embodiment, all sealing devices of the production machine, including any fitment sealing device, are located at one and the same station of the production machine. For example, the sealing devices acting in succession to provide the various seals without the film material being moved relative to the sealing devices during the entirety of the various sealing steps. In an embodiment, all said sealing devices are arranged in one sterile or aseptic chamber of the production machine.

In an embodiment of the production machine, the sealing station is configured to establish a bottom gusset seal of the pouch, e.g. a bottom gusset seal located within opposing side edges of the pouch, e.g. in a horizontal form-fill-seal machine. The production machine according to this embodiment may provide that the entire bottom gusset seal of the pouch may be established with only a single heat impulse, providing for a fast and reliable sealing of bottom gusset.

The invention also relates to a method for the impulse sealing of two walls made from heat-sealable material, preferably metal-free heat-sealable film material, wherein use is made of a sealing station or a sealing device as described herein.

The invention also relates to a method for the production of collapsible pouches, wherein use is made of a sealing station, or a sealing device, and/or a production machine as described herein.

The invention also relates to a sealing station or device as described herein for use in the production of collapsible pouches.

The invention also relates to an impulse sealing station or device for use in the production of spouted collapsible pouches as described herein.

A second aspect of the present invention relates to a system comprising a sealing station configured to heat seal a wall made from heat-sealable film material, preferably metal-free heat-sealable film material, onto one another wall of heat-sealable material, e.g. another wall of heat-sealable film material, to create a sealed seam, wherein the sealing station comprises:
an impulse sealing device comprising a first jaw and a second jaw,
an actuator device configured to move the first and second jaws relative to one another between an opened position and a clamped position,
a cooling device configured to cool at least one of the first and second jaws,
wherein the first jaw has a first front surface configured to contact an elongated seam region of a respective first wall made from heat-sealable material,
wherein the second jaw has a second front surface configured to contact an elongated seam region of a respective second wall made from heat-sealable material,
wherein at least the first jaw comprises at the respective front surface thereof at least one, e.g. a single elongated, impulse heatable member that extends along the respective front surface and that is covered by a heat-resistant non-stick covering,
wherein the sealing station is configured to perform an impulse sealing cycle, wherein the actuator device is configured to bring the first and second jaws into the clamped position, so that the seam regions of the first and second walls are clamped against one another by the first and second jaws, and wherein the sealing station is configured to, in the clamped position, temporarily energize each impulse heatable member so as to generate an impulse of heat that is emitted by each heatable member, which impulse of heat seals the seam regions of the first and second walls to each other, wherein at least one of the first and second jaws is cooled by the cooling device after termination of the energizing of the impulse heatable member, and wherein the actuator device is configured to move the first and second jaws into the opened position after the impulse heatable member has cooled down,
wherein the system further comprises a conveyance mechanism that is configured to convey the walls to be sealed along a path of conveyance in a continuous motion, said path at least extending along the sealing station, and wherein the sealing station comprises a motion device that allows to move the first and second jaws in synchronicity with the continuously moving walls to be sealed during the impulse sealing cycle.

The second aspect of the invention allows to achieve a high production rate, as the impulse sealing cycle can be short and as there is no start and stopping for the sealing, e.g. of the pouches, or string of interconnected pouches.

In the second aspect of the invention the impulse heatable member can be embodied as a resistor band through which an electric current is passed to create the impulse of heat, e.g. as described in DE19737471.

In the second aspect the invention the impulse heatable member can be embodied as a susceptor element comprising electrically conductive material, said susceptor element having a rear side facing away from the respective contoured front surface, wherein at least one of the jaws comprises an inductor, and wherein the sealing station comprises a high frequency electric current source, which is connected to the inductor, wherein the sealing station is configured so that, in the impulse sealing cycle, the electric current source is operated to temporarily feed a high frequency electric current to the inductors, thereby generating a high frequency electromagnetic field with the inductor, wherein the high frequency electromagnetic field induces eddy currents in the susceptor element generating an impulse of heat that is emitted by the susceptor element, which impulse of heat seals the seam region of the walls to each other.

In an embodiment of the second aspect of the invention, the inductor comprises an elongated inductor section that extends along the respective front surface at the rear side of the respective at least one susceptor element.

The sealing station may be embodied with details as described herein with reference to the first aspect of the invention, including one or more of the optional and/or preferred details thereof, e.g. as stated in the appended claim set.

The second aspect of the invention also relates to a method wherein use is made of the system.

A third aspect of the invention relates to a sealing station configured to heat seal a wall made from heat-sealable film material, preferably metal-free heat-sealable film material, onto one another wall of heat-sealable material, e.g. another wall of heat-sealable film material, to create a sealed seam, wherein the sealing station comprises:
an impulse sealing device comprising a first jaw and a second jaw,
an actuator device configured to move the first and second jaws relative to one another between an opened position and a clamped position,
a cooling device configured to cool at least one of the first and second jaws,
wherein the first jaw has a first front surface configured to contact an elongated seam region of a respective first wall made from heat-sealable material,
wherein the second jaw has a second front surface configured to contact an elongated seam region of a respective second wall made from heat-sealable material,
wherein at least the first jaw comprises at the respective front surface thereof at least one, e.g. a single elongated, impulse heatable member that extends along the respective front surface and that is covered by a heat-resistant non-stick covering,
wherein the sealing station is configured to perform an impulse sealing cycle, wherein the actuator device is configured to bring the first and second jaws into the clamped position, so that the seam regions of the first and second walls are clamped against one another by the first and second jaws, and wherein the sealing station is configured to, in the clamped position, temporarily energize each impulse heatable member so as to generate an impulse of heat that is emitted by each heatable member, which impulse of heat seals the seam regions of the first and second walls to each other, wherein at least one of the first and second jaws is cooled by the cooling device after termination of the energizing of the impulse heatable member, and wherein the actuator device is configured to move the first and second jaws into the opened position after the impulse heatable member has cooled down,
wherein each impulse heatable member is a susceptor element comprising electrically conductive material, said susceptor element having a rear side facing away from the respective front surface,
and wherein at least one of the first and second jaws comprises an inductor, preferably the first jaw comprises an inductor, wherein the inductor is electrically insulated from the susceptor element,
wherein, preferably, the inductor comprises an elongated inductor section at the rear side of the at least one susceptor element,
and wherein the sealing station comprises a high frequency electric current source, which is connected to the inductor,
wherein the sealing station is configured so that, in the impulse sealing cycle, the electric current source is operated to temporarily feed a high frequency electric current to the inductor, thereby generating a high frequency electromagnetic field with the inductor, wherein the high frequency electromagnetic field induces eddy currents in the susceptor element generating an impulse of heat that is emitted by the susceptor element, which impulse of heat seal the seam regions of the walls to each other,
and wherein the inductor and corresponding susceptor element, e.g. both arranged in the first jaw, are configured such that the high frequency electromagnetic field generated by the inductor primarily causes a rapid development of heat within a frontal skin layer of the susceptor element due to the skin effect.

The sealing station may be embodied with details as described herein with reference to the first aspect of the invention, including one or more of the optional and/or preferred details thereof, e.g. as stated in the appended claim set.

The third aspect of the invention also relates to a method wherein use is made of the sealing station.

A fourth aspect of the invention relates to a sealing station configured to heat seal a wall made from heat-sealable film material, preferably metal-free heat-sealable film material, onto an annular attachment flange of a plastic spout made from heat-sealable material, to create a sealed joint between them, wherein the sealing station comprises:
an impulse sealing device comprising a first jaw and a second jaw, an actuator device configured to move the first and second jaws relative to one another between an opened position and a clamped position,
a cooling device configured to cool at least one of the first and second jaws,
wherein the first jaw has a first front surface configured to contact an annular seal region of the wall made from heat-sealable film material, preferably made from metal-free heat-sealable film material,
wherein the second jaw has a second front surface configured to contact an annular seal region of the annular attachment flange of a plastic spout made from heat-sealable material,
wherein the first jaw comprises at the respective front surface thereof at least one, e.g. a single, impulse heatable member that extends along the respective front surface and that is covered by a heat-resistant non-stick covering,
wherein the sealing station is configured to perform an impulse sealing cycle, wherein the actuator device is configured to bring the first and second jaws into the clamped position, so that the annular seal regions of the wall and the annular attachment flange are clamped against one another by the first and second jaws, and wherein the sealing station is configured to, in the clamped position, temporarily energize each impulse heatable member so as to generate an impulse of heat that is emitted by each heatable member, which impulse of heat seals the annular seal regions of the wall and the annular attachment flange to each other, wherein at least one of the first and second jaws is cooled by the cooling device after termination of the energizing of the impulse heatable member, and wherein the actuator device is configured to move the first and second jaws into the opened position after the impulse heatable member has cooled down,
wherein each impulse heatable member is a susceptor element comprising electrically conductive material, said susceptor element having a rear side facing away from the respective front surface,
wherein the susceptor element is an annular susceptor element, which extends about a central axis that is aligned perpendicular to the front surface of the respective jaw,
and wherein the first jaw comprises an inductor at the rear side of the susceptor element, wherein the inductor is electrically insulated from the susceptor element,
wherein each inductor comprises an inner inductor section and an outer inductor section, which extend adjacent one another and concentrically with each other about the central axis, wherein the inner and outer inductor sections are interconnected in series and are spaced from one another by a slit, e.g. an air slit or a slit filled with electrically insulating material, that faces the susceptor element,
and wherein the sealing station comprises a high frequency electric current source, which is connected to the inductor,
wherein the sealing station is configured so that, in the impulse sealing cycle, the electric current source is operated to temporarily feed a high frequency electric current to the inductor, which flows through the inner and outer inductor sections in opposite directions, thereby generating a high frequency electromagnetic field with the inductor, wherein the high frequency electromagnetic field induces eddy currents in the susceptor element generating an impulse of heat that is emitted by the susceptor element, which impulse of heat seal the annular seal regions of the walls to each other.

The fourth aspect of the invention enables the sealing of a spout made of heat-saleable material to a wall of heat-sealable film material, e.g. to a pouch wall, wherein an annular attachment portion of the spout may be sealed against the film material and wherein a tubular neck of the spout can be received in the passage of the respective jaw, e.g. to face away from the film material.

In the fourth aspect of the invention, the sealing station can be embodied to heat seal a spout to a pouch wall, for example to heat seal an annular attachment flange of a spout, e.g. a Bag-in-Box spout, of the type disclosed in WO 2015189036 A1.

In an embodiment, the susceptor element extends substantially about a central susceptor opening to define a passage of the first jaw, e.g. for receiving a tubular neck of the plastic spout.

In a further embodiment, the inner and outer inductor sections extend substantially about a central inductor opening, forming a continuation of the central susceptor opening for defining the passage of the first jaw.

In an alternative embodiment, the second jaw comprises a passage for receiving the tubular neck of the plastic spout.

In an embodiment, the inner and outer inductor sections each comprise a terminal for electrical connection to the current source at one end of the inductor, and the inner and outer inductor sections are interconnected in series at an opposed end of the inductor.

In a further embodiment, the inner and outer inductor sections are interconnected by a connecting portion integral with the inductor sections.

In a further embodiment, the connection portion, seen in a view onto the front surface of the respective jaw, projects in said view outside the susceptor element.

In an alternative embodiment, the connection portion, seen in a view onto the front surface of the respective jaw, overlaps in said view with the susceptor element, and wherein the connection portion is located in a plane that is set at a distance from a plane of the inner and outer inductor sections, e.g. set further away from the front surface of the respective jaw.

In an embodiment, the susceptor element has a circular shape.

In an alternative embodiment, the susceptor element has a rectangular, for example a square shape.

The sealing station may be embodied with details as described herein with reference to other aspects, e.g. the first aspect of the invention, including one or more of the optional and/or preferred details thereof, e.g. as stated in the appended claim set.

The fourth aspect of the invention also relates to a method wherein use is made of the sealing station.

The fourth aspect of the invention also relates to a method for the impulse heat sealing of a wall made from heat-sealable film material, preferably metal-free heat-sealable film material, onto one another wall of heat-sealable material, e.g. an annular attachment flange of a plastic spout made from heat-sealable material, wherein use is made of a sealing station or a sealing device as described herein.

The fourth aspect of the invention also relates to a method for the production of collapsible pouches with a spout, wherein use is made of a sealing station, and/or comprising the method for the impulse heat sealing as described herein.

A fifth aspect of the invention relates to a production machine for the production of collapsible pouches, said pouches each having walls made from heat-sealable film material, preferably metal-free heat-sealable film material, wherein the production machine comprises a sealing station that is configured to heat seal two adjacent pouches in a string of interconnected pouches made from heat-sealable film material, e.g. to establish respective adjacent side or vertical seals of both pouches and to establish at least one horizontal, e.g. top and/or bottom seal of at least one of the pouches, wherein the sealing station comprises:
an impulse sealing device comprising a first jaw and a second jaw,
an actuator device configured to move the first and second jaws relative to one another between an opened position and a clamped position,
a cooling device configured to cool at least one of the first and second jaws,
wherein the first jaw has a first front surface configured to contact side edge regions of a respective first wall of two adjacent pouches, preferably also configured to contact a top and/or bottom edge region of the first wall of at least one of the pouches,
wherein the second jaw has a second front surface configured to contact side edge regions of a respective second wall of the two adjacent pouches, preferably also configured to contact a top and/or edge bottom region of the second wall of at least one of the pouches,
wherein at least one, preferably each, of the first and second jaws comprises at the respective front surface thereof at least one, e.g. a single elongated, impulse heatable member that extends along the respective front surface and that is covered by a heat-resistant non-stick covering,
wherein the production machine is configured such that, in operation, the string of interconnected pouches is positioned in between the first and second jaws and such that the impulse heatable members project each at least partially over the side edge regions of two adjacent interconnected pouches, preferably also over the top and/or bottom edge region of at least one of the pouches,
wherein the sealing station is configured to perform an impulse sealing cycle, wherein the actuator device is configured to bring the first and second jaws into the clamped position, so that—at least in the side edge regions, preferably also in the top and/or bottom edge regions—the first and second walls are clamped against one another by the front surfaces of the first and second jaws, and wherein the sealing station is configured to, in the clamped position, temporarily energize the one or more impulse heatable members so as to generate an impulse of heat that is emitted by each of the impulse heatable members, wherein the first and second jaws, at least the one or more impulse heatable members thereof, cool down after termination of the energizing assisted therein by operation of the cooling device, and wherein the actuator device is configured to move the first and second jaws into the opened position after the one or more impulse heatable members have cooled down,
wherein each impulse heatable member is a susceptor element comprising electrically conductive material, said susceptor element having a rear side facing away from the respective front surface,
wherein the susceptor element comprises a first elongated susceptor part and a second elongated susceptor part, which are integrally connected in series, wherein, in operation, the first elongated susceptor part projects over the side edge regions of the two adjacent interconnected pouches, and wherein, in operation, the second elongated susceptor part projects over the bottom edge region or the top edge region of at least one of the two adjacent interconnected pouches,
and wherein at least one, preferably each, of the first and second jaws comprises an inductor that extends along the respective front surface, wherein the inductor is electrically insulated from the susceptor element,
and wherein the sealing station comprises a high frequency electric current source, which is connected to the inductor,
wherein the sealing station is configured so that, in the impulse sealing cycle, the electric current source is operated to temporarily feed a high frequency electric current to the inductor, thereby generating a high frequency electromagnetic field with the inductor, wherein the high frequency electromagnetic field induces eddy currents in the susceptor element generating an impulse of heat that is emitted by the susceptor element, which impulses of heat seal at least the bottom regions of the adjacent pouches, preferably also the top and/or bottom region of at least one of the pouches.

The above-mentioned production machine guides the string of interconnected pouches in a horizontal direction. It is understood that the fifth aspect of the invention also concerns pouch production machines in which the string of interconnected pouches extends in a vertical direction, in the which the above-mentioned side edge region should be understood as a top edge region or bottom edge region, and in which the above-mentioned top edge region or bottom edge region should be understood as side edge regions.

The production machine according to the fifth aspect of the invention has a susceptor element that comprises at least two elongated susceptor parts. These elongated susceptor parts are preferably aligned at a right angle with respect to each other. This enables the sealing of a side region, e.g. a left side region, of a first pouch and of a side region, e.g. a right side region, of an adjacent second pouch in a string of interconnected pouches by means of the heat impulse from the first elongated susceptor part, whilst simultaneously sealing a top edge region and/or a bottom edge region of at least one of the first or second pouch by means of the heat impulse from the second elongated susceptor part. In this way, at least part of an entire contour of a pouch may be sealed in one impulse sealing cycle, reducing the number of sealing cycles that is required to seal the pouches, thereby enabling higher production rates and pouch production machine with smaller foodprints.

According to the fifth aspect of the invention, the susceptor element may thereby have a front surface that is shaped as an L or as an upside-down L, for example having a first, e.g. vertical, elongated susceptor part and a second, e.g. horizontal elongated susceptor part. With the first and second elongated susceptor parts, e.g. the L-shaped susceptor, the side edge regions of the pouches may be sealed with the first, e.g. vertical, elongated susceptor part and simultaneously with the bottom edge region of one of the pouches that may be sealed with the second, e.g. horizontal elongated susceptor part. For pouches with an open top edge region, for example for pouches that receive a spout after filling and/or for pouches of which the top edge region is sealed after filling, this single sealing station with the L-shaped susceptor may be sufficient to seal the entire side and bottom contour of the pouch. Hence, the first side edge region, e.g. a left side edge region, of a first pouch may be sealed first and the second side edge region, e.g. a right side edge region, and the bottom edge region of this first pouch are sealed when the first side edge region of an adjacent second pouch is sealed.

In an embodiment, the inductor of a jaw comprises a first elongated inductor part and a second elongated inductor part, which are interconnected in series, wherein the first elongated inductor part, seen in a view onto the front surface of the respective jaw, overlaps in said view with the first elongated susceptor part, and wherein the second elongated inductor part, seen in a view onto the front surface of the respective jaw, overlaps in said view with the second elongated susceptor part.

In an embodiment, the susceptor element further comprises a third elongated susceptor part, which is integrally connected in series with the first elongated susceptor part and the second elongated susceptor part, wherein, in operation, the second elongated susceptor part projects over the bottom edge region of at least one of the two adjacent interconnected pouches, and wherein, in operation, the third elongated susceptor part projects over the top edge region of at least one of the two adjacent interconnected pouches. In this way, the heat impulse from the second elongated susceptor part is configured to heat seal the bottom edge region of at least one of the two adjacent interconnected pouches and the heat impulse from the third elongated susceptor part is configured to heat seal the top edge region of at least one of the two adjacent interconnected pouches.

According to this embodiment, the susceptor element may thereby have a front surface that is shaped as a C or as a U on its side, for example having a first, e.g. vertical, elongated susceptor part, a second and a third, e.g. horizontal elongated susceptor parts. With the three elongated susceptor parts, e.g. the U-shaped susceptor, the side edge regions of the pouches may be sealed with the first, e.g. vertical, elongated susceptor part and simultaneously with the bottom edge region of one of the pouches that may be sealed with the second, e.g. horizontal elongated susceptor part and with the top edge region of one of the pouches that may be sealed with the third, e.g. horizontal elongated susceptor part. For completely-closed pouches, this single sealing station with the U-shaped susceptor may be sufficient to seal the entire contour of the pouch. Hence, the first side edge region, e.g. a left side edge region, of a first pouch may be sealed first and the second side edge region, e.g. a right side edge region, the bottom edge region and the top edge region of this first pouch are sealed when the first side edge region of an adjacent second pouch is sealed.

In a further embodiment, the inductor of a jaw comprises a third elongated inductor part, which is integrally connected in series with the first elongated inductor part and the second elongated inductor part, wherein the third elongated inductor part, seen in a view onto the front surface of the respective jaw, overlaps in said view with the third elongated susceptor part.

In an embodiment, the inductor comprises an inner inductor section that faces, at least during operation, towards a central region of the pouch, and an outer inductor section that faces, at least during operation, away from central region of the pouch, wherein the inner and outer inductor sections extend adjacent one another and spaced from one another by a slit, e.g. an air slit or a slit filled with electrically insulating material, that faces the susceptor element, Preferably, the inner inductor section is formed by inner inductor sections of the first, second and preferably third inductor part being connected in series and the outer inductor section is formed by outer inductor sections of the first, second and preferably third inductor part being connected in series.

In a further embodiment, the inner and outer inductor sections each comprise a terminal for electrical connection to the current source at one end of the inductor, and the inner and outer inductor sections are interconnected at an opposed end of the inductor, in series.

In a further embodiment, the inner and outer inductor sections are interconnected by a connecting portion integral with the inductor sections. The terminals of the inductor may be provided at an end of the second inductor part or at an end of the third inductor part and the connecting portion may, respectively, be provided at the end of the third inductor part or at the end of the second inductor part In an embodiment, at least during the impulse sealing cycle, the high-frequency electric current flows through the inner and outer inductor sections in opposite directions.

The production machine, or the sealing station thereof may be embodied with details as described herein with reference to other aspects, e.g. the first aspect of the invention, including one or more of the optional and/or preferred details thereof, e.g. as stated in the appended claim set.

The fifth aspect of the invention also relates to a method for the production of collapsible pouches, wherein use is made of a production machine as described herein.

Embodiments of the invention will be described by way of example only, with reference to the accompanying drawings. In the drawings:

FIG. 1 schematically shows a view in perspective of an embodiment of the pouch production according the invention, FIG. 2 schematically shows an example of a standing pouch, FIG. 3 schematically shows a triple point of the pouch of FIG. 2, FIG. 4 schematically shows an embodiment of the sealing device according to the invention, FIG. 5 schematically shows the susceptor element and inductor of FIG. 4, FIG. 6 schematically shows a cross section of a jaw including the susceptor element and inductor, FIG. 7 schematically shows a cross section of a jaw including the susceptor element, inductor, and resilient backing layer of the susceptor element, FIGS. 8A,B, C schematically shows the electromagnetic field generated by the jaw of FIG. 4 and the interaction with the susceptor element, FIG. 9 shows an alternative design of the inductor, FIG. 10 shows yet another alternative design of the inductor, FIG. 11 illustrates schematically the operation of a continuous motion sealing device, FIG. 12 schematically shows an alternative embodiment of an inductor and a susceptor element of a sealing device, FIG. 13 schematically shows an embodiment of a sealing station for the sealing of an annular flange of a plastic spout and a wall of heat-sealable film material, FIGS. 14A and 14B schematically shown cross-sections of a sealed joint between a plastic spout and a wall of heat-sealable film material, and FIGS. 15A and 15B illustrate schematically two different embodiments of the sealing stations in a pouch production machine.

FIG. 1 schematically illustrates an example of a pouch production machine and related operating method according to the invention for the production of collapsible pouches made from heat-sealable film material. The machine is also known a Form-Fill-Seal (FFS) machine, in particular in the depicted embodiment a horizontal FFS machine.

Throughout the figures, the pouch production machine is referred to with reference numeral 1.

The pouch production machine 1 is configured to produce collapsible pouches 100, here standing collapsible pouches, that are filled with a product. In the depicted example the top edge is sealed over its length. In an alternative embodiment, a plastic spout or other fitment is sealed into the top edge.

The pouch production machine 1 has a frame (not shown) provided with a film supply device 10 that is adapted to receive one or more rolls 11 of flexible heat-sealable film material 12. In the machine 1, the film material 12 is unwound from the roll 11.

The machine 1 comprises a bottom gusset folding device 13 to fold the film material 12 dispensed from a single roll into a folded shape, so that two pouch walls 101, 102 oppose one another and so that the bottom has a gusset as is well known in the art.

In the depicted exemplary embodiment, film material travels horizontally.

The folding device 13 is configured to fold the film material 12 such the film material 12 is formed into a first pouch wall 101 and an opposed second pouch wall 102, in order to define an interior of the pouch 100 in between them, with first and second gusset portions in the bottom part.

After folding, the film material travels along a bottom heat sealing station A with a heat sealing device 20.

The bottom sealing device 20 is configured to heat seal the pouch in the region of the gusset, e.g. to make a heat seal between the first pouch wall and the first gusset portion that is directly inward thereof and a heat seal between the second pouch wall and the second gusset portion that is directly inward thereof.

Downstream of the first or bottom heat sealing device 20, the machine 1 comprises a second or side seam heat sealing station B with a heat sealing device 21.

The second heat sealing device 21 is aligned perpendicular to the horizontal direction (H) and is configured to provide a side seam in the pouch. As shown the side seam extends over at least a section of the height of the pouch, e.g. over the majority or even the entirety of the height of the pouch. For example, the actual height of the side seam made by sealing device 21 depends on the structure and operation of the bottom seal device 20.

As will be explained in more detail below, in an embodiment, the heat sealing device 21 may provide a side seam that extends over a so-called triple point. As known in the art of pouch production the triple point is where there are two walls to be joined on one side of the point, here above the triple point, and wherein there are two pairs of two wall segments (so four wall thicknesses in total) to be joined on the other side of the triple point, here below the triple point.

In the depicted embodiment, the film conveyance device 40, here comprising rollers driving the film material arranged downstream of device 21, moves the folded film material in a stepwise manner along the stationary first and second heat sealing devices 20, 21. At the relevant position in front of the first heat sealing device 20, the film material 12 is held to form the gusset bottom seal formations. Simultaneously, the film material 12 is held at a relevant location in front of the second heat sealing device 21 to form the lateral or side seam of the pouch 100.

One or more of the first heat sealing device 20 and the second heat sealing device 21 comprises a first jaw and a second jaw for heat sealing the material 12.

Once the bottom seal formations and both side seams of the pouch have been formed, the machine opens the top of the pouch 100, more specifically opens the non-bonded upper edge. This may for example be done using suction gripper engaging the top regions of the walls 101, 102 and moving them apart.

Once the top edge is opened, at station C a filling device 50, fills a product, e.g. a liquid and/or solid product, into the pouch 100 via the non-bonded upper edge.

Then, at a top edge sealing station E, the non-bonded upper edge of the pouch 100 is sealed after the filling, by upper edge sealing device 200.

A cutting device 60 is provided to separate a filled and hermetically sealed pouch 100 from string of interconnected pouches.

FIGS. 2 and 3 schematically show a gusset bottom pouch 100 and the so-called triple point.

The pouch has side walls 101, 102 and a gusset bottom 103 with first a second gusset portions 101a, 102a that are folded along inner fold line 104 by folding device 13.

The pouch 100 is sealed in the gusset bottom 103 by the sealing device 20 which is embodied to make a heat seal 107 between the first pouch wall 101 and the first gusset portion 101a that is directly inward thereof and a heat seal between the second pouch wall 102 and the second gusset portion 102a that is directly inward thereof.

The pouch is further sealed, ahead of any filling, along first and second side seams 105, 106, also called lateral seams.

The pouch is further sealed along upper edge region 113, e.g. after the product has been filled into the pouch via the edge region 113.

As shown in FIG. 3 the triple point is where there are two walls 101, 102 of the pouch 100 to be joined on one side of the point, here the part of the side seam above the triple point, and wherein there are two pairs of two wall segments (so four wall thicknesses in total) to be joined on the other side of the triple point, here the part of the side seam below the triple point.

In FIG. 4, an embodiment of a sealing station E is displayed schematically in more detail, partially in exploded-view along with the pouch 100 that has already been sealed in the upper edge region thereof.

The sealing station E comprises:
- a heat sealing device comprising a first jaw 210 and a second jaw 220,
- an actuator device, here with actuator 201 for jaw 210 and actuator 202 for jaw 220, configured to move the first and second jaws 210, 220 relative to one another between an opened position and a clamped position.

The first jaw 210 has a first front surface configured to contact the edge region of a respective first wall 101 of the pouch.

The second jaw 220 has a second front surface configured to contact the edge region of a respective second wall 102 of the pouch.

The first and second front surfaces are straight or rectilinear when seen from above and are generally planar.

Each of the first and second jaws 210, 220 comprises at the respective front surface thereof one single elongated, heatable member 212, 222 that extends along the respective front surface and that is covered by a heat-resistant non-stick covering (not shown in FIG. 4 for clarity).

The sealing station E is configured to perform a sealing cycle, so that the upper edge region of the pouch 100 is hermetically sealed.

In the cycle, the actuator device 201, 202 is configured to bring the first and second jaws 210, 220 into the clamped position, so that—in the edge region—the first and second walls 101, 102 are clamped against one another by the planar front surfaces of the first and second jaws 210, 220.

The sealing station E is configured to perform a sealing cycle. Once the jaws 210, 220 have been moved into the clamped position as indicated above, electric current source 250 is operated to temporarily feed a high frequency electric current to the inductors 211, 221. This generates a high frequency electromagnetic field by means of the inductors. In turn, the high frequency electromagnetic field induces alternating eddy currents in the respective susceptor element 212, 222 generating an brief and vehement impulse of heat that is emitted by the susceptor element 212, 222. These impulses of heat seal the edge region of the walls 101, 102 to each other in the upper edge region.

So the station E temporarily energizes the susceptor elements 212, 222 on the basis of induction, so as to generate an impulse of heat that is emitted by each of the elements 212, 222.

The first and second jaws 210, 220, at least the susceptor elements 212, 222 thereof, cool down after termination of the energizing assisted therein by operation of the cooling device 250.

The actuator device 201, 202 is configured to move the first and second jaws 210, 220 into the opened position after the cooling down has taken place in satisfactory manner.

It is shown in FIGS. 4 and 5, that in each jaw 210, 220 there is just one pair of elongated inductor sections 221a, b that are parallel to one another and vertically spaced from one another by a horizontal slit 221c. The pair of inductor sections is arranged in proximity of the rear side of the susceptor element. The provision of just one pair of inductor sections 221a, b is a preferred embodiment for a top seal of a pouch.

In an embodiment, the elongated inductor section 221a, b is made from a metal, e.g. of copper.

It is shown in FIGS. 4 and 5, that the at least one elongated inductor section 221a,b is a solid cross-section metal or other, preferably high conductivity material inductor section, e.g. made of copper which is preferred. This arrangement allows to avoid undue variations of current density within the inductor section, and thereby undesirable variation in the generated field, e.g. compared to an internally hollow inductor section.

It is shown in FIGS. 4 and 5, that the at least one elongated inductor section 221a,b has a constant cross-section, preferably a solid cross-section, over its length along the contoured front surface of the respective jaw. This design avoids undue variations of current density within the inductor section, which might otherwise occur at locations where the cross-section changes, and thereby undesirable variation in the generated field.

It is shown in FIGS. 4 and 5, that the uniform cross-section elongated inductor section 221a, b has, seen in a top view onto the jaw, a shape corresponding to the front surface of the jaw and maintains a uniform distance between the susceptor element 222 and the elongated inductor section 221a,b. This arrangement enhances uniformity of the development of heat in the susceptor element.

In alternative embodiments, the inductor may have a non-constant cross-section, for example locally having a cross-section that is narrower than a nominal cross-section, to increase locally the current density for the high-frequency electric current, in order to locally increase the intensity of the heat impulse emitted by the susceptor element.

In embodiments, the distance between the inductor and the susceptor element may locally vary from the uniform, e.g. nominal distance between the inductor and the susceptor element. With a distance that is locally narrower, for example, the electric magnetic field in the susceptor is increased locally, in order to locally increase the intensity of the heat impulse emitted by the susceptor element.

The horizontal slit 221c can be air slit or a slit filled with electrically insulating material.

In embodiments, said slit 221c between neighbouring inductor sections 221a, b that are arranged above one another has a height between 0.01 and 5 mm, more preferably between 0.1 and 2 mm.

The presence of the slit 221c between the parallel elongated inductor sections 221a, b allows for a desirable concentration of the field that is generated by the inductor of the jaw onto the susceptor element 222. This is illustrated in FIGS. 8A,B, and C.

As explained herein, the field is fairly homogenous, which enhances homogeneity of the impulse heating of the susceptor 222 and thereby the quality and reliability of the sealing process. In particular, undue variations in temperatures to which the film material is subjected are avoided, which would otherwise arise if the field were irregular.

Figure 4:
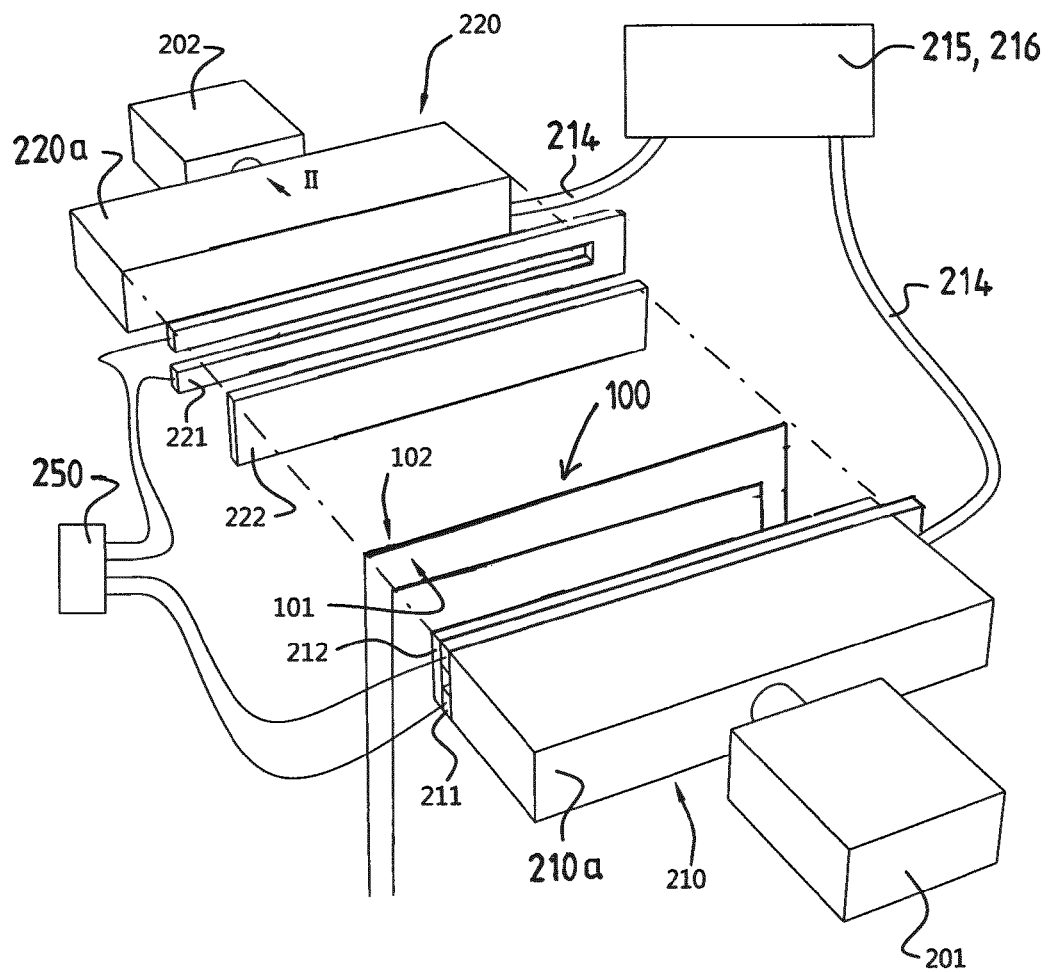
Figure 5:
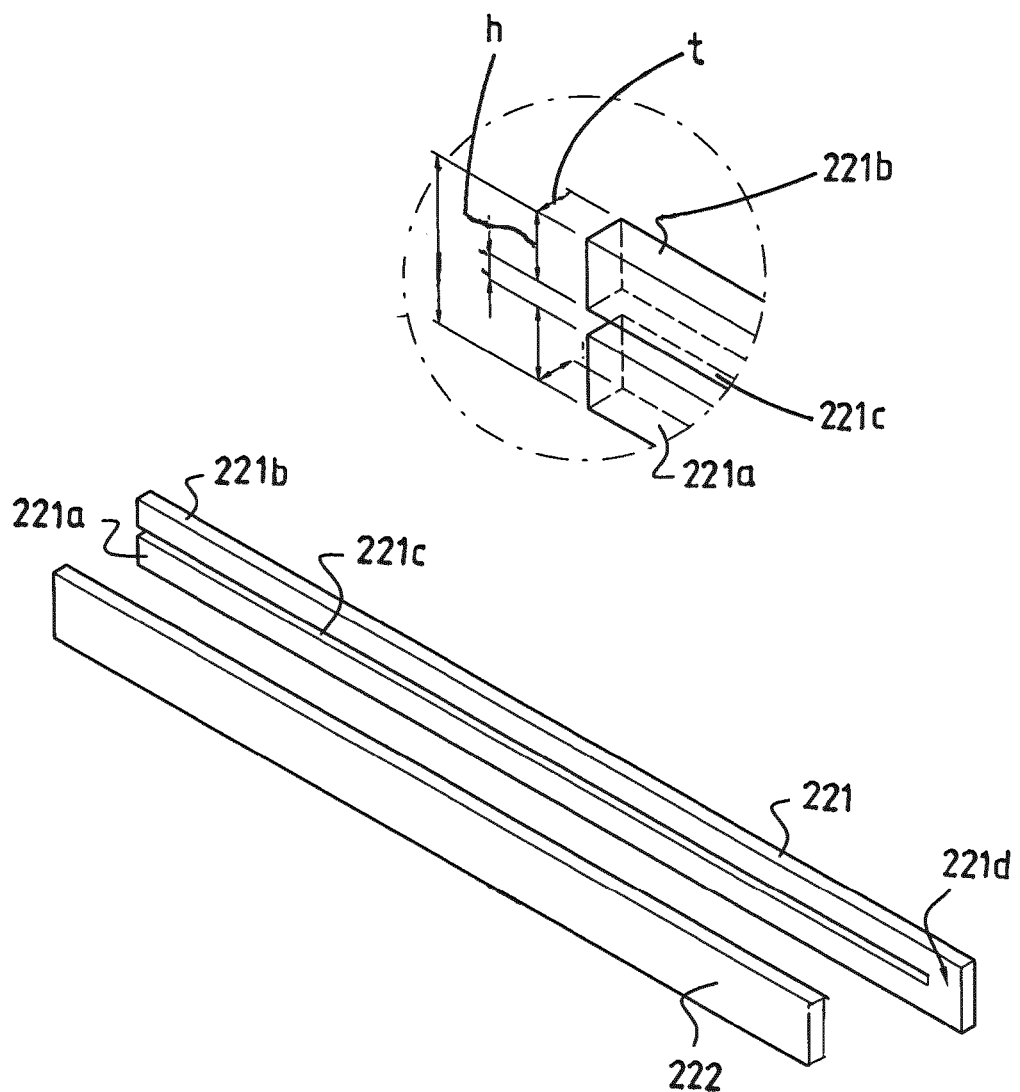

It is shown in FIGS. 4 and 5, that the susceptor element 222 extends, seen in a view onto the front surface of the jaw, over the horizontal slit 221c between the parallel inductor sections 221a,b.

It is shown in FIGS. 4 and 5, that the susceptor element 222, seen in a view onto the front of the jaw, extends over the slit 221c between parallel elongated inductor sections 221a,b and overlaps in said view with each of the parallel inductor sections.

It is shown in FIGS. 4 and 5, that the susceptor element 222 is embodied as one strip that extends over the slit 221c between parallel elongated inductor sections 221a,b and overlaps in said view with each of the parallel inductor section.

It is shown in FIGS. 4 and 5, that a strip shaped susceptor element 222 has an upper edge and a lower edge defining a height of the strip, wherein the height of the strip is at least 50% of the height of the single pair of inductor sections 221a, b including the slit 221c that are arranged at the rear of the strip above one another, e.g. between 75% and 125% of said height, e.g. about 100% of said height.

It is shown in FIGS. 4 and 5, that a strip shaped susceptor element 222 has an upper edge and a lower edge defining a height of the strip, wherein the inductor of a jaw comprises a number of, e.g. multiple, inductor sections 221a, b that each extend along the rear side of the susceptor element. Herein the height of the strip is preferably at most the same as the height of the number of one or more inductor sections, preferably the upper edge and the lower edge of the strip not protruding above and below the height of the one or more inductor sections.

It is shown in FIGS. 4 and 5, that the inductor of a jaw is embodied so that in a pair of adjacent and parallel inductor sections 221a, b arranged at the rear side of the susceptor element 222, the current flows in opposite directions through the inductor sections.

It is shown in FIGS. 4 and 5, that the inductor of a jaw comprises a C-shaped inductor element having parallel first and second inductor sections interconnected at one axial end of the inductor, e.g. by a connecting portion 221*d* integral with the inductor sections, in series, wherein the free ends of the inductor sections have terminals for electrical connection to the current source. The connection portion 221*d* is, as preferred, located outside the region where the susceptor element 222 is located, as the connector portion 221*d* is likely to show irregular field effects that might lead to non-homogeneity of the heating of the susceptor element.

It is shown in FIG. 4, that the first and the second jaws are each provided with one C-shaped inductor element, having parallel first and second inductor sections interconnected in series, wherein the free ends of the inductor sections have terminals for electrical connection to the current source 250.

It is shown in FIGS. 4 and 5, that the inductor of a jaw comprises a C-shaped inductor element having parallel first and second inductor sections 221*a,b* interconnected in series and arranged above one another, wherein the inductor sections are separated by a horizontal slit 221*c*, e.g. an air slit or a slit filled with electrically insulation material.

It is shown in FIGS. 4 and 5, that the inductor of a jaw comprises multiple, e.g. just two, elongated inductor sections 221*a,b* arranged parallel to one another and arranged above one another behind the susceptor element 222.

In an embodiment the at least one elongated inductor section 221*a, b* has a thickness "t" of between 1.0 and 4.0 mm, seen perpendicular to the front surface of the jaw, for example between 1.5 and 3.0 mm. The limited thickness of the inductor element enhances the cooling of the jaw, including the inductor of the jaw, e.g. as one or more cooling fluid, e.g. liquid coolant, e.g. water, ducts are, preferably, arranged in proximity of a rear side of the at least one inductor element.

In an embodiment the at least one elongated inductor section has a rectangular cross-section with a height "h" that is greater than the thickness "t" of the inductor section. This arrangement allows to limit the thickness, which allows for efficient cooling.

Figure 6:
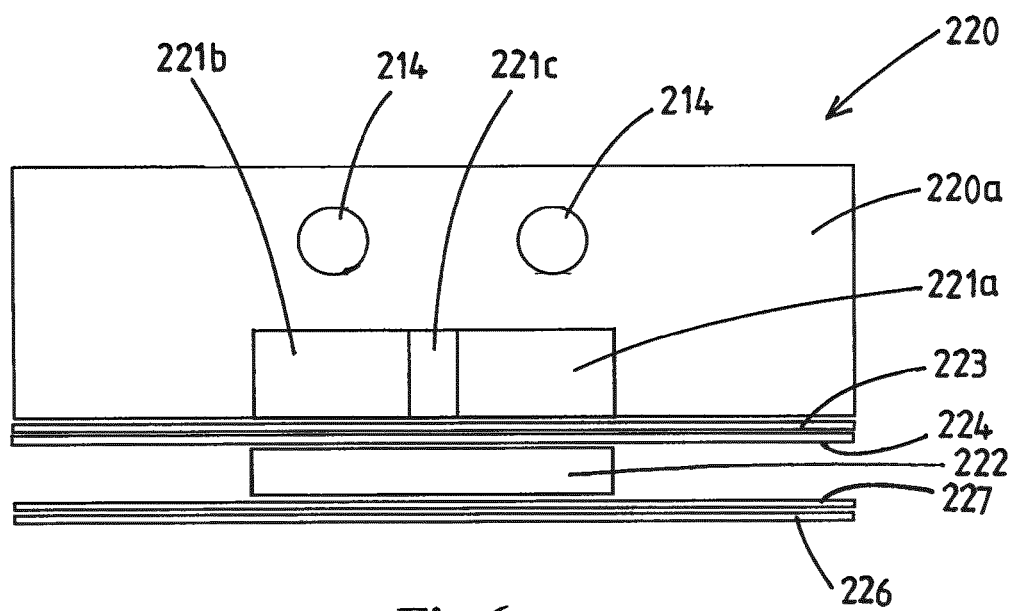

It is shown in FIGS. 4 and 6, that each jaw may be provided with one or more cooling fluid ducts 214, e.g. the cooling fluid being a cooling liquid, e.g. water, being passed through the cooling fluid ducts, e.g. using a pump assembly 215, e.g. a cooling liquid circuit being a closed circuit including a heat exchanger 216 configured to remove heat from the cooling liquid.

Preferably, no cooling fluid is passed in a region between the inductor and the susceptor as that would unduly increase the distance between them and would impair effectivity of the impulse heating induced by the field. It will be appreciated, that in view of the desired very close proximity of the susceptor element to the front surface of the jaw, there is in practice no space for any cooling duct in said region. So, in practical embodiments, cooling of the jaw is preferably done using a control flow of cooling fluid, e.g. liquid, through one or more ducts that are arranged behind, and preferably in close proximity to, the inductor sections.

In an embodiment, at least one cooling fluid duct 214 extends along the at least one inductor section 221*a, b* that extends along the rear side of the susceptor element 222.

It is preferred for the machine 1 to be configured such that cooling of the jaws 210, 220 is active during the entire impulse sealing cycle, so also during the creation of the heat impulse which happens so fast that it is generally not impaired by the cooling. In another configuration the cooling may be interrupted or reduced around the moment of the heat impulse.

The cooling of the jaws 210, 220 may, as preferred, be configured to cause cooling of the heat-sealed edge region before the jaws 210, 220 are opened, e.g. the film material and fitment 150 in the fused region being cooled to below 60° C. before opening, e.g. to below 40° C.

A benefit of the cooling is that, before the release from the jaws 210, 220, the sealed region of the pouch 100 will acquire a strength and rigidity that is greater than in absence of such cooling. This, for instance, may allow for an increased production speed of the machine 1 wherein higher forces may be exerted on the walls of the pouch 100, e.g. in view of transport of the pouch or string of interconnected pouches through the machine. Undue stretching of the pouch, e.g. in the area of the fitment seal, is preventable to a large degree by use of the invention disclosed herein.

In an embodiment, the susceptor element 212, 222 is made of metal material, e.g. a metal or a metal alloy, e.g. of a thin metal strip.

For example, the susceptor element 212, 222 is made of, or comprises, aluminium, nickel, silver, stainless steel, molybdenum and/or nickel-chrome.

It is shown in FIGS. 4 and 5, that the susceptor element 212, 222 is embodied as a strip having opposed front and rear main faces that define the thickness of the strip between them. In an embodiment, the thickness of the susceptor element strip 212, 222 is constant over the extension of the strip.

It is shown in FIGS. 4 and 5, that the susceptor element 212, 222 is embodied as a planar strip, most preferably the jaw having a single planar strip susceptor element. This arrangement as a planar strip is in particular preferred for the handling of plastic fitments that have an attachment portion with planar and preferably smooth sealing faces.

It is shown in FIG. 4, that the planes of the susceptor elements 212, 222 are parallel to one another. The preferred smoothness of the fronts of the jaws, so the absence of a relief that locally holds the wall of film material away from the front face and creates air pockets between the wall 101, 102 and the front surface, causes a very effective transfer of the heat impulse from the jaw 210, 220 to the zone where the joint is made. In practice it can be observed that a joint is achieved through the entirety of the area where the susceptor 212, 222 emits heat towards the lightly clamped walls 101, 102.

It is shown in FIGS. 4 and 5, that the susceptor element 212, 222 is a strip, e.g. of a metal, e.g. of aluminium, wherein the height of the strip is between 3 and 10 millimetres, e.g. between 4 and 8 millimeters. It is shown in FIG. 4, that the strip has a constant height over its length.

It is shown in FIGS. 4 and 5, that the susceptor element 212, 222 strip lacks apertures over its extension.

It is shown in FIGS. 4 and 5, that the jaws 210, 220 are each provided with a single continuous susceptor element 212, 222 embodied as a strip, e.g. of metal.

It is shown in FIGS. 4 and 5, that the susceptor element 222, e.g. embodied as a strip, has a thickness of between 0.01 and 5 mm, preferably between 0.05 and 2 mm, more preferably between 0.08 and 0.8 mm, e.g. of between 0.08 and 0.5 mm. In general, it is considered desirable to have a minimum thickness of the susceptor element in view of the desire to rapid cool the jaw, including the inductor and the susceptor, after termination of the heat impulse. A thin design of the susceptor, contributes to this desire. It is noted that, in contrast to the impulse sealing device addressed in the introduction, no electric current from a current source is passed through the susceptor, so the cross-section need not be designed to deal with such a current flow.

It is shown in FIGS. 4 and 5, that the jaw is provided with a single continuous susceptor element 222 embodied as a strip, e.g. of metal, having a height of the strip between 3 and 10 millimetres, e.g. between 4 and 8 millimeters, and a thickness of between 0.08 and 0.8 mm, e.g. of between 0.08 and 0.5 mm. For example, the strip is made of aluminium material.

In embodiments, the frequency of the electric current supplied by source 250 to the inductors 211, 221 of the jaws 210, 220 is between 100 kHz and 1 MHz, for example between 250 KHz and 750 KHz.

In embodiments, the magnitude of the electric current supplied by source 250 to the inductors 211, 221 of the jaws 210, 220 is between 20 A and 600 A.

In embodiment, the electric current is supplied by source 250 to the inductors 211, 221 of the jaws 210, 220 at a voltage with a magnitude between 40 V and 500 V.

It is shown in FIGS. 4 and 8A-C, that a jaw 210, 220 is embodied such that the high frequency electromagnetic field generated by the inductor 211, 221 primarily causes the very rapid development of heat within a frontal skin layer of the susceptor element 212, 222 due to the so-called skin effect. The skin effect is the tendency of an alternating electric current to become distributed within a conductor such that the current density is largest near the surface of the conductor and decreases, exponentially, with greater depths of the conductor. At high frequencies the skin depth becomes smaller. This depth may, for example, be 0.15 mm for an aluminium susceptor element if the frequency of the field is 350 KHz. The thickness of the susceptor element is envisaged to be more than this skin depth, yet not too much for the reason addressed herein.

It is shown in FIG. 4, that the spacing between the rear of the susceptor element 212, 222 and the neighbouring inductor section(s) is at a minimum 0.025 mm, or 0.05 mm, or 0.1 mm and at a maximum 3.0 mm, or 2.0 mm, or 1.0 mm. The minimum values of this spacing are primarily envisaged to allow for effective electrical insulation between the inductor section(s) on the one hand and the susceptor element on the other hand. In embodiments, it is envisaged that this spacing is only filled with electrically insulating material. The maximum value of this spacing is primarily envisaged to have the inductor section(s) in close proximity to the rear of the susceptor element, wherein a maximum of 1.0 mm is preferred. In a practical embodiment this spacing may be 0.05 mm. So this spacing may in practical embodiments be less than the thickness of the susceptor element itself.

Preferably, the entire spacing between the rear of the susceptor element and the neighbouring inductor section(s) is filled with electrically insulating material.

FIG. 6 illustrates that the spacing between the rear of the susceptor element 222 and the neighbouring inductor section 221 is filled with multiple layers of electrically insulating tape, for example at least a layer of Kapton 223 and a layer of Teflon 224, for example just one layer of Kapton tape and one Layer of Teflon tape.

In an embodiment the electrical insulation between the rear of the susceptor element and the neighbouring inductor section(s) has a thickness of between a minimum of 0.025, or 0.050, or 0.1 mm, and a maximum of at most 3.0 mm, or 2.0 mm.

In an embodiment the anti-stick layer 226 at the front of the jaw is embodied as a layer of Teflon tape. In another embodiment the anti-stick layer could comprises glass or the like.

FIG. 6 illustrates that the front face of the susceptor element 22 is covered by at least one layer of electrically insulating material 227, e.g. Kapton, e.g. Kapton tape, e.g. having a thickness of between 0.01 and 0.05 mm, e.g. of about 0.025 mm.

In an embodiment the spacing between the front surface of the jaw and the susceptor element is at a minimum 0.025 mm, or 0.050 mm, and at a maximum 2.0 mm, or 1.0 mm, or 0.5 mm. Herein, the minimum spacing may be governed by the presence of an anti-stick layer 226. The anti-stick layer can be coated onto the jaw, e.g. onto the susceptor element, e.g. a glass or Teflon coating.

In an embodiment, the spacing between the front surface of the jaw and the susceptor element is filled with at least one, e.g. multiple layers of electrically insulating material, e.g. tape, for example at least a layer of Kapton tape 227 and a layer of Teflon tape 226 as anti-stick layer forming the front surface of the jaw, for example just one layer of Kapton tape and one Layer of Teflon tape.

It is shown in FIGS. 4 and 5, that the contoured front surface of the jaws 210, 220 is smooth in a region of contact with the walls 101, 102 of film material, so lacking or devoid of any relief that would locally keep the film material away from the front surface, so lacking for example one or more ribs, bosses, etc.

It is shown in FIG. 4, that the jaws 210, 220 are configured, e.g. have a length, so that the entire non-bonded edge region is sealed in one cycle by the operation of the jaws. This avoids the needs for additional sealing actions along said edge region.

It is shown, that both jaws 210, 220 have a main body 220a, e.g. of plastic or ceramic material, e.g. a heat-resistant material, e.g. of PEEK, on which the susceptor element and the inductor are mounted. The plastic or ceramic material is selected to not impair the field that is generate by the inductor, at least not in an undesirable manner. Boron nitride and/or Aluminium nitride, Polyphenylene sulphide (PPS), vulcanized silicone materials can be considered as well for the main body. In particular Boron nitride may provide for a good thermal conductivity, thereby enabling a good conductivity of heat from the susceptor element towards the cooling device, e.g. towards the cooling fluid.

One or more cooling ducts 214 are provided, e.g. machined, in a main body.

For example, one or both jaws 210, 220 have a main body, having a main body front side into which one or more grooves are made in which the one or more induction sections are arranged. In embodiments the susceptor element is arranged over the main body front side, as discussed herein relative to the one or more inductor sections. Herein, one or more layers of electrically insulation material are arranged between the inductor section(s) and the susceptor elements, e.g. of Kapton and/or Teflon. One or more further layers of electrically insulation material as well as an outer anti-stick covering are mounted over the susceptor element to from the front surface of the jaw.

In embodiment, the sealing device of station E is configured to generate a heat impulse with the susceptor elements 212, 222 of between at least 150° C. and at most any of 200° C., 300° C., 400° C., or 500° C. measured on the susceptor element.

In an embodiment, the heat impulse duration lies between 10 and 1000 milliseconds, e.g. between 20 and 500 milliseconds, e.g. between 75 and 400 milliseconds.

In an embodiment, the cycle includes a clamped cooling phase directly following the heat impulse during which the jaws 210, 220 are maintained in clamped position, which clamped cooling phase may have a duration between 200 and 800 milliseconds, e.g. between 300 and 600 milliseconds.

It is noted that control of the temperature that is reached during the impulse heating may be done on the basis of monitoring and controlling the supply of electrical power to the inductors and/or by monitoring and controlling the temperature and/or flow rate of cooling fluid circulated along the respective jaws.

The production machine 1 is primarily envisaged for production of pouches from metal-free film material. For example, the film material of the walls is a multi-layer material where one and the same plastic, but with different properties, is found in all layers. In another embodiment the wall is a monolayer wall. The absence of a metal layer allows for more effective recycling.

It will be appreciated that the sealing station E may also be arranged to provide a vertical seam in the pouch, e.g. the sealing device 21 being embodied as the sealing station E described above.

Figure 7:
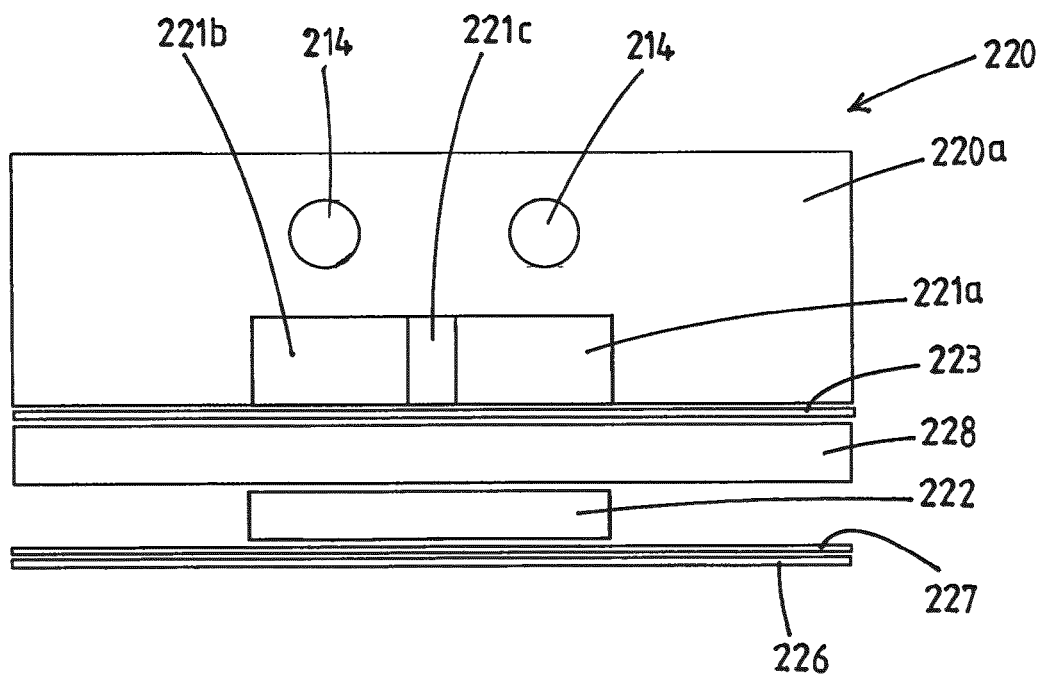
Figure 8A:
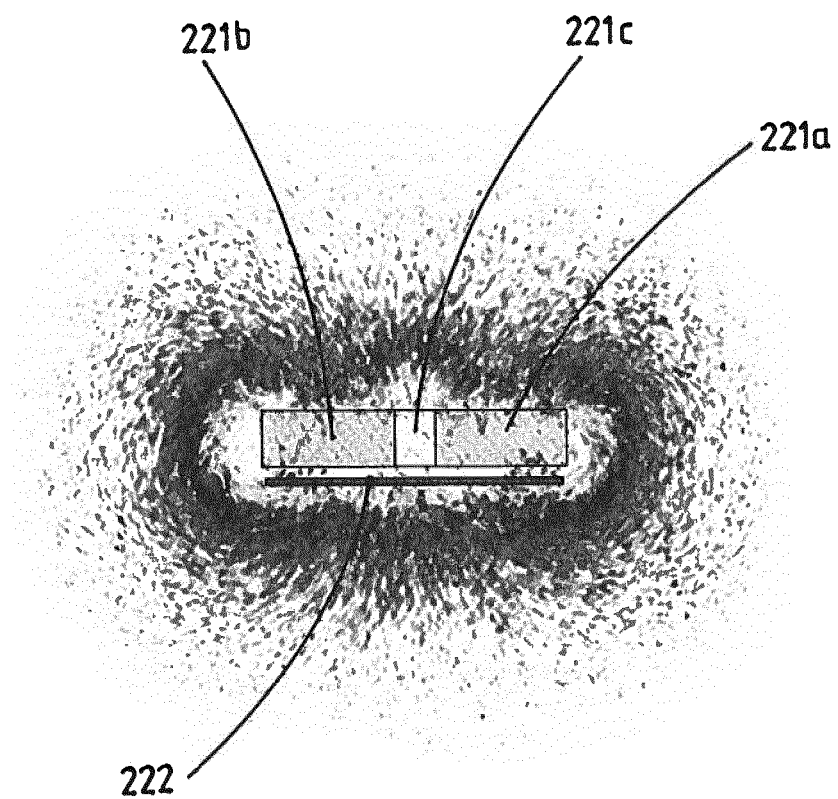
FIG. 8B illustrates the strength and distribution of the field when seen from above onto the front of a jaw, wherein the field is indicate with FLd and is shown in relation to the inductor 221 and susceptor 222.
FIG. 8C illustrates the strength and distribution of the field of FIG. 8B in a perspective view.
Figure 8B:
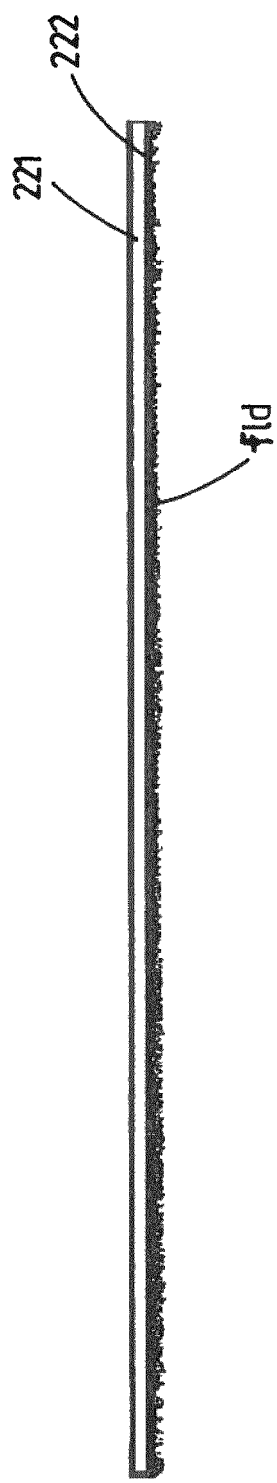
Figure 8C:
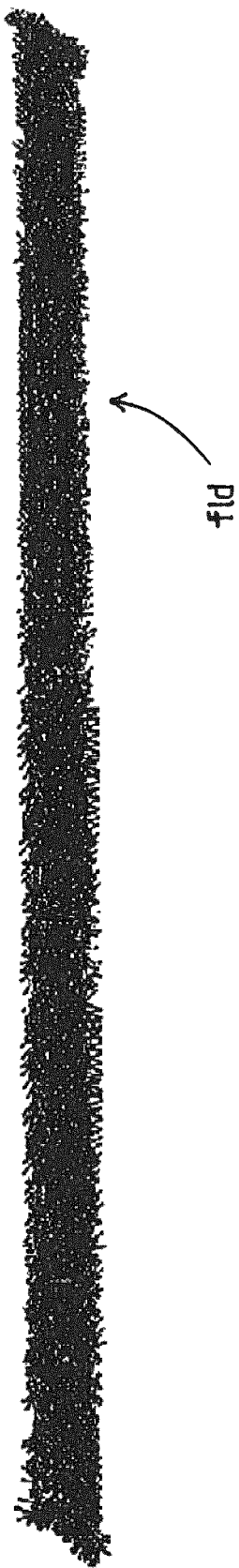

As discussed, in case of a gusset bottom pouch, e.g. standing pouch, a triple point as shown in FIG. 3 will be present in the vertical side of the pouch. For a sealing device according to the present invention and envisaged to provide a seal that extends the triple point, the embodiment as illustrated in FIG. 7 may be advantageous.

In such a situation it can be advantageous to provide a resilient backing layer 228, e.g. of vulcanized silicone rubber and/or Teflon, behind the susceptor element 222, thereby allowing for the jaw front to accommodate for a local variation of the number of film material walls. For example, the resilient layer 228 has a thickness between 0.1 and 2.0 millimeter, e.g. between 0.5 and 1.0 mm. Herein it is understood that the thin susceptor element 222 is able to flex so as to accommodate the local variation in the number of walls.

Figure 1:
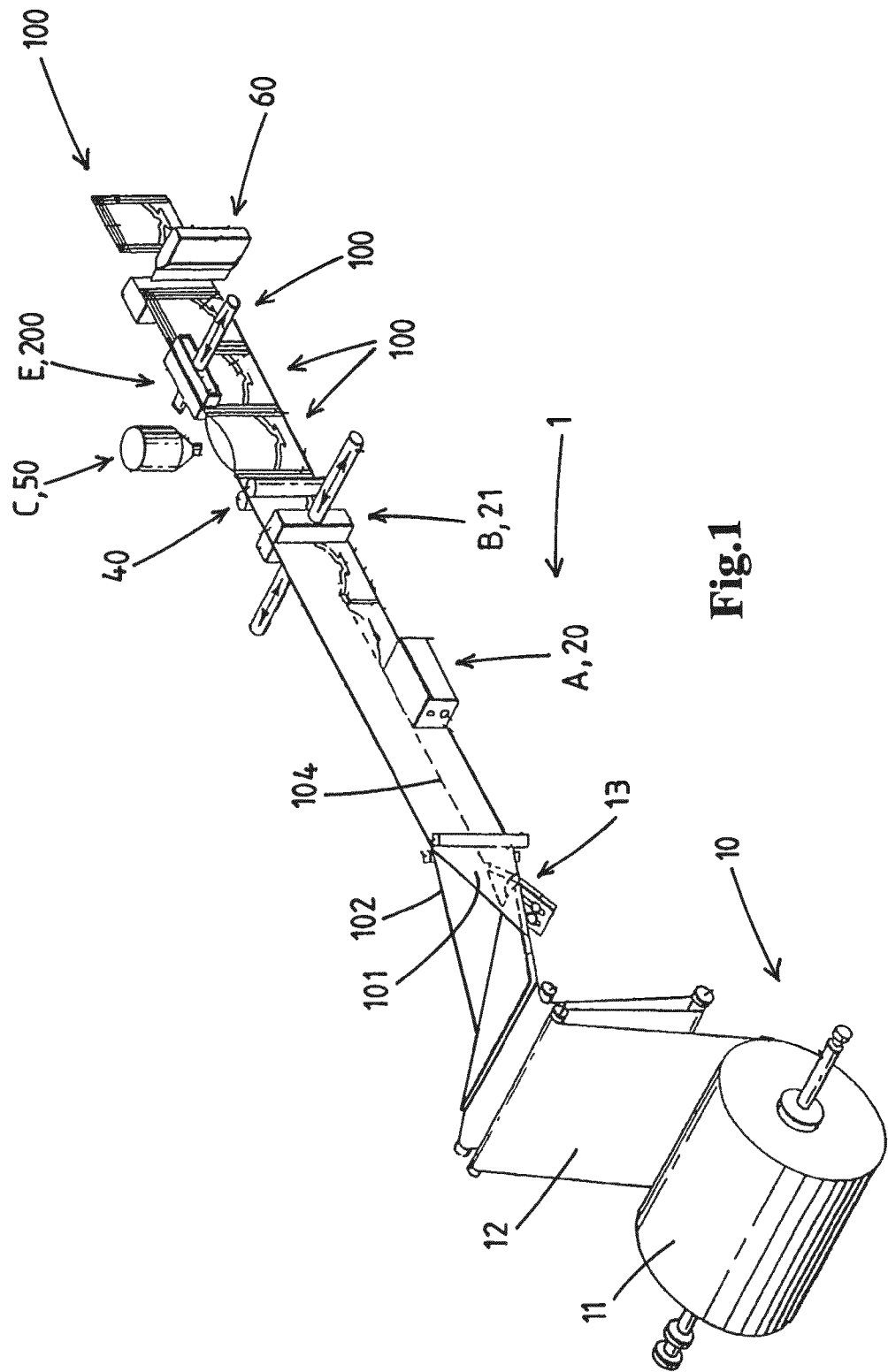
Figure 9:
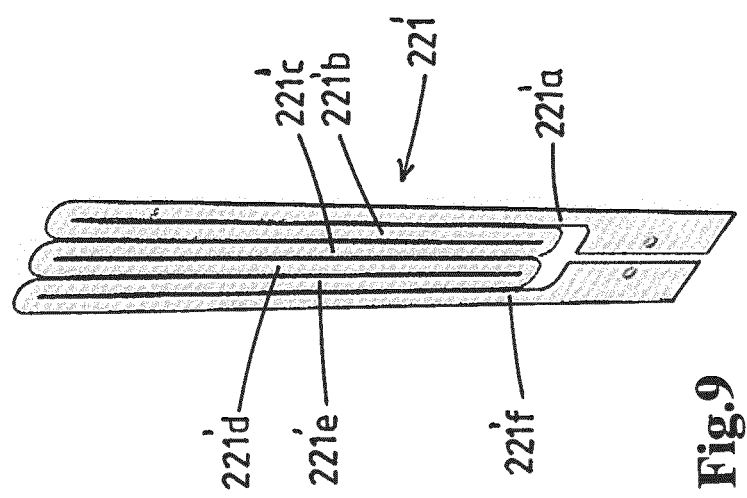

FIG. 9 shows an embodiment, wherein the inductor 221' of a jaw is designed to create a rather wide sealing seam, e.g. a vertical or side seam to two adjacent pouches ahead of the pouches being separated by a cut through this sealing seam. E.g. a wide seal at station B of FIG. 1. For example, a sealing seam having a width of between 15 and 40 millimeters.

Instead of a single pair of elongated inductor sections, the inductor 221' has more than two inductor sections in a parallel arrangement, e.g. at least four or even six as shown here by way of example. It is envisaged that the susceptor 222 lies over the inductor 221' as explained above. The inductor sections 221'a,b,c,d,e,f are connected in series and arranged in a serpentine arrangement, with the inductor elements being generally in a common plane. Between adjacent inductor sections 221'a,b,c,d,e,f a slit is present as discussed herein.

The free ends of the first section 221'a and of the last section 221'f form the terminals of the inductor 221' for connection to the current source. The thickness of the inductor sections, as preferred, is less than the height or width of each of them, so as to facilitate rapid cooling of the inductor.

Figure 10:
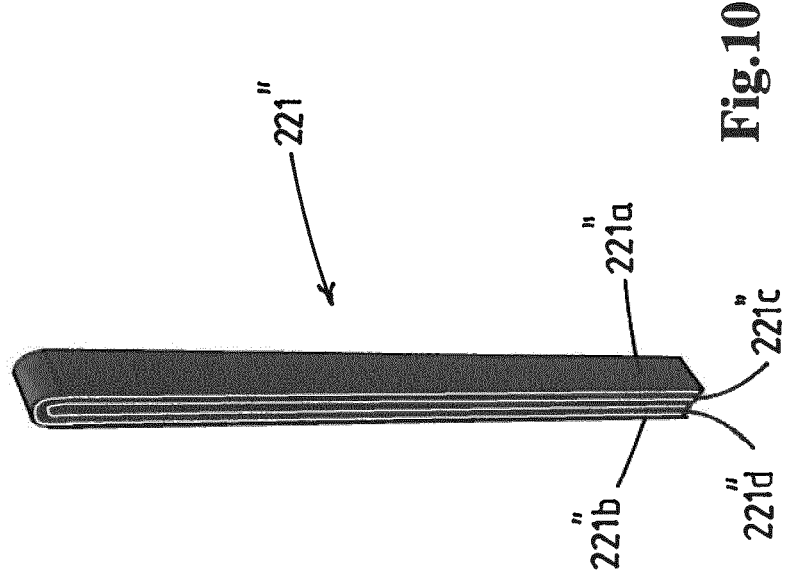

The FIG. 10 depicts an embodiment wherein the thickness of the inductor sections 221"a,b,c,d exceeds the height or width of them. Whilst this creates an effective field, cooling is less effective than with the embodiment of FIG. 9.

The inductor 221' comprises multiple nested C-shaped inductor elements, here two, each having parallel first and second inductor sections interconnected in series, e.g. by a bent portion, wherein the free ends of these inductor sections have terminals for electrical connection to the current source.

Figure 11:
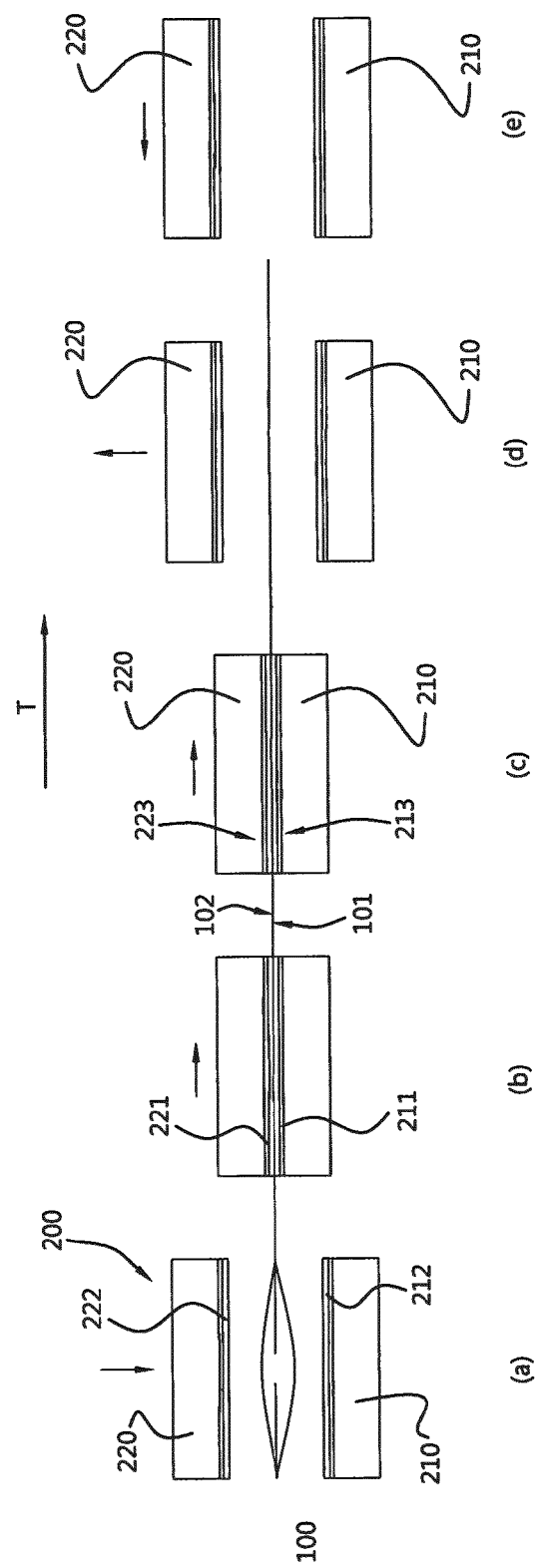

In FIG. 11, the impulse sealing of top edge regions of a first pouch wall 101 and of a second pouch wall 102, is displayed schematically by means of steps (a)-(e).

In the displayed embodiment, the sealing device 200 comprises a first jaw 210 and a second jaw 220. During the production of the pouches, the pouch walls 101, 102 are moved continuously in a transportation direction (T), from left to right in FIG. 11, e.g. at a constant speed. For example, in practice, a continuous web having two opposed walls of heat-sealable film material, e.g. with a bottom gusset, is advanced in the transportation direction between the jaws 210, 220 of the sealing device. Therefore, the pouch walls 101, 102 of a pouch to be made are still interconnected with adjoining pouch walls, e.g. as a string of still interconnected pouches.

The welding device 200 is configured to move along with the pouch walls 101, 102 in the transportation direction (T), at least during the sealing cycle.

The cycle is started with step (a), shown on the left side of FIG. 11. The first jaw 210 and the second jaw 220 are initially in a position spaced from the pouch walls 101, 102 that may still be somewhat opened in in upper region.

Upon operation of the first actuator device 201, the first jaw 210 is moved towards its clamped position, wherein the first jaw 210 comes in contact with the first pouch wall 101. Similarly, the second jaw 220 is moved towards its clamped position by the second actuator device 202, wherein the second jaw 220 comes in contact with the second pouch wall 102. In the respective clamped positions, the first pouch wall 101 and the second pouch wall 102 are lightly clamped onto one another in the region of the seam to be formed along the upper edge. The clamping is lightly as no pressure is involved in the sealing process.

Next, during step (b), the jaws 210, 220 remain in their respective clamped positions and move along with the pouch walls 101, 102. Step (b) is an impulse sealing step, during which an electromagnetic field is provided in the first inductor 211 and in the second inductor 221, in order to induce respective heat impulses in the first susceptor 212 and in the second susceptor 222.

Under the influence of the heat impulses, the first pouch wall 101 and the second pouch wall 102 are locally fused with each other along the seam, in order to fuse the pouch walls 101, 102 against each other.

During step (c), the heat impulses are no longer provided as the inductors are no longer energized, but the jaws 210, 220 remain in their clamped positions. Cooling fluid is being circulated through the ducts 214 in the jaws 210, 220. Preferably, this supply of cooling fluid may be continued during all steps (a)-(e) of the process. Accordingly, heat is removed from the welded pouch 100 as well.

During step (d), the first jaw 210 and the second jaw 220 are moved away from each other, into the opened position. As such, the welded pouch 100 may be taken over by a further handling device, to allow for further processing thereof, such as packaging. Upon moving them away from each other, the jaws 210, 220 again become spaced.

Finally, during step (e), the first jaw 210 and the second jaw 220 are moved back towards their initial position. This movement may take place in a direction opposite to the transportation direction (T), in order to effect that the jaws 210, 220 become arranged in their initial positions, similar as on the onset of step (a).

After moving the jaws 210, 220 back during step (e), the cycle is repeated, starting with step (a) again.

It will be appreciated that the path of the jaws 210, 220 can be of any suitable shape, e.g. circular, oval, linear, etc.

For example, the jaws 210, 220 are mounted on a reciprocating support that moves in reciprocating manner parallel to the direction of transportation. Cooling liquid can be circulated along the jaws with flexible hoses.

Figure 12:
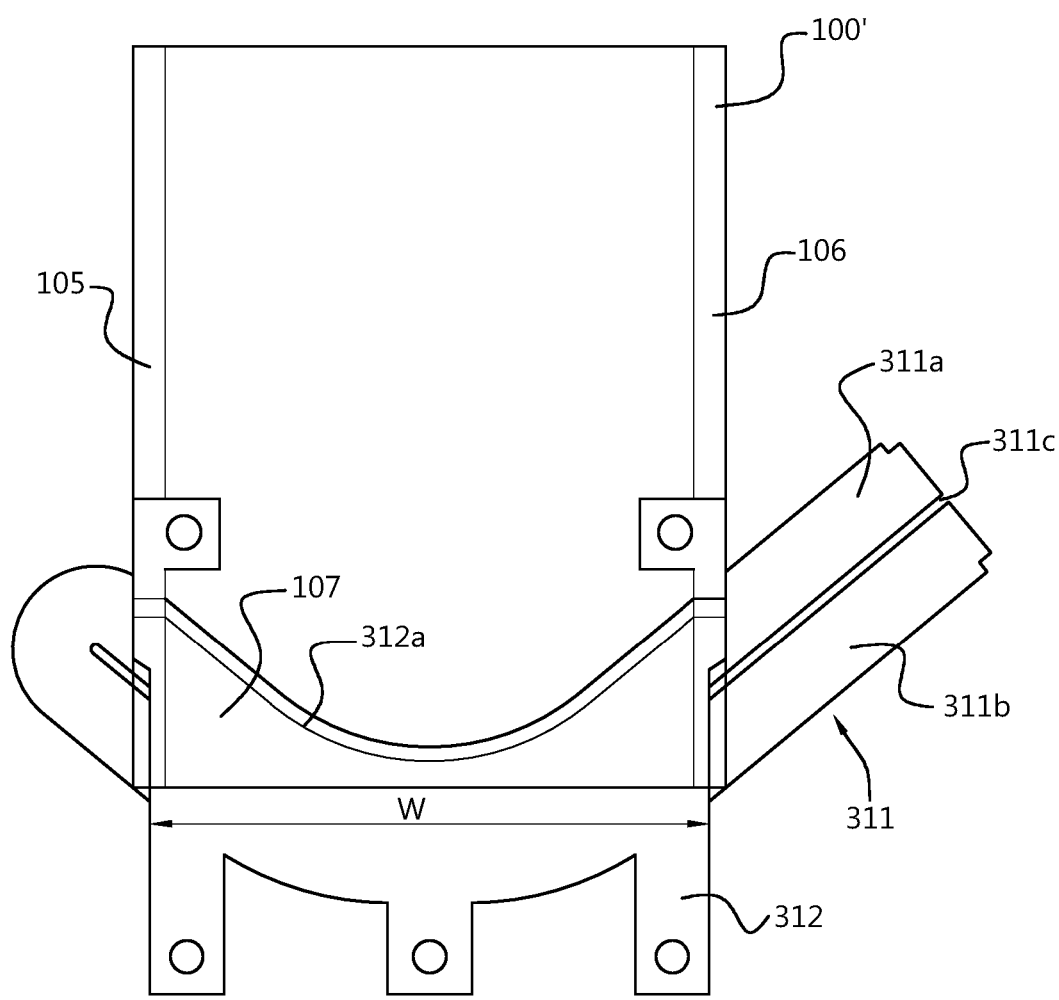

In FIG. 12, an alternative embodiment of an inductor and a susceptor element of a sealing device is schematically displayed in combination with the bottom gusset pouch 100 of FIG. 2. This inductor 311 and this susceptor element 312 are both configured to seal a W-shaped bottom gusset 107 between a first wall and second wall of a pouch bottom gusset pouch 100'. The susceptor element 312 is a plate-shaped susceptor element and has a width W that corresponds to a width of the pouch 100, in between a first side edge, at the first side seam 105, and a second side edge, at the second side seam 106.

The inductor 311 spans beyond the width W of the susceptor element 312 and the width of the pouch 100.

The inductor 311 comprises a first inductor section 311a and a second inductor section 311b, that are parallel to one another and vertically spaced (so in the direction of the height of the pouch) from one another by a slit 311c. The slit 311c is at least present in front of the entire susceptor element 312, in order to provide that, at least in the susceptor element 312, the electromagnetic field is substantially homogeneous.

When an electromagnetic field is briefly generated by means of the inductor 311, the induced eddy currents in the susceptor element 312 will generate a heat impulse. The parts of the pouch 100 that overlap with the susceptor element 312 will therefore undergo the heat sealing, as a result of the increased temperature. The seal that is created by means of the sealing device has a shape that corresponds to the portion of the susceptor element 312 that comes in contact with the film material of the pouch 100. Furthermore, as the result of the width W of the susceptor element 312 relative to the pouch, the entire bottom gusset 107 can be sealed with only a single heat impulse.

The susceptor element 312 does not project beyond the outer contours of the pouch 100, e.g. at least not beyond both side edges of the pouch. Since the heat impulse is only effected in the susceptor element 312, only the part of the pouch covered by the susceptor element 312 will be sealed with the heat impulse. Since the susceptor element 312 does not project beyond the side edges of the pouch 100, a single heat impulse will only seal this single pouch 100 and will not result in sealing of adjacent pouches, in particular not of adjacent pouches in a string of interconnected pouches.

As displayed in the front view in FIG. 12, the susceptor element 312 has an upper edge 312a that defines a concave shape. As shown this shape has a relatively high profile at opposing side edges and has a relatively low profile at a central portion in between the side edges. As such, the created bottom gusset seal is relatively high at the side edges of the pouch 100, at the respective side seals 105, 106. Furthermore, the bottom gusset seal is relatively low in between the side edges of the pouch 100.

The inductor 311 has a concave shape that corresponds to the concave upper edge 312a of the susceptor element 312, being formed by the inductor sections 311a, 311b that are curved. Since the curved inductor 311 follows the upper edge 312a of the susceptor element 312, a homogeneous electromagnetic field may be provided in the upper region of the susceptor element 312, e.g. along the concave upper edge 312a thereof. Accordingly, the generated heat impulse in the susceptor element 312 has desirable properties, for example being homogeneous over the entire susceptor element 312, by which a corresponding homogeneous seal may be obtained for the bottom gusset 107.

Figure 13:
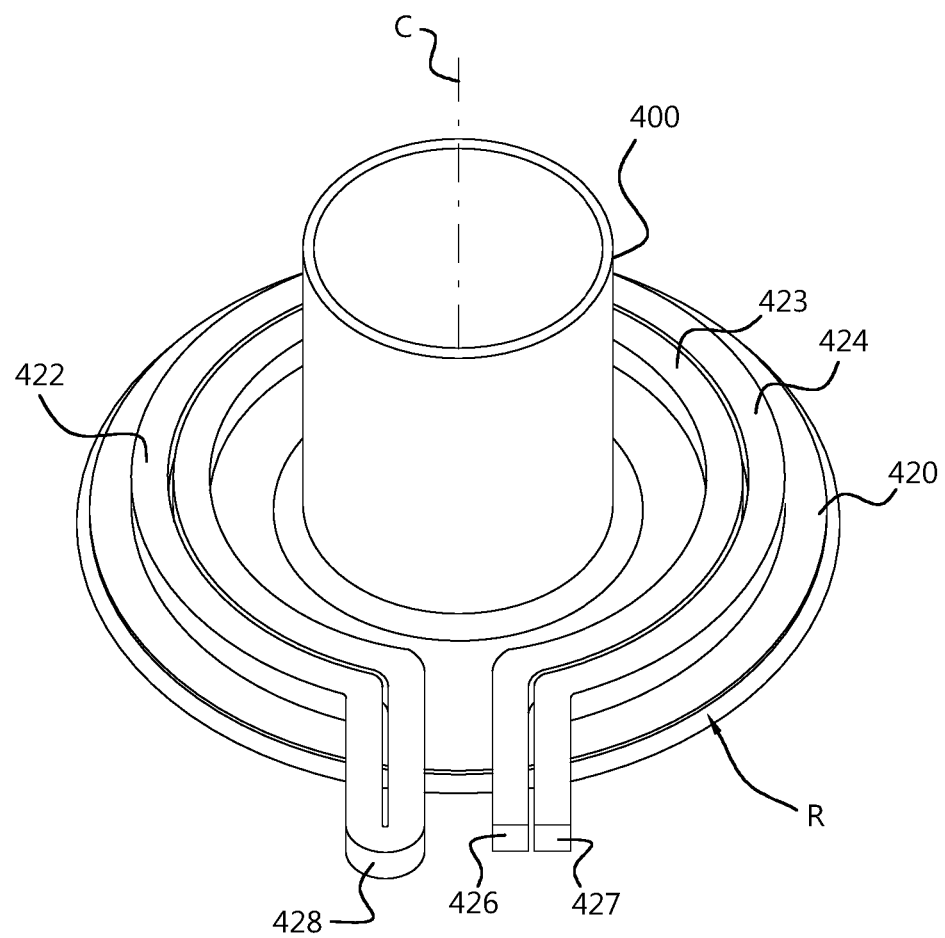
Figure 14A:
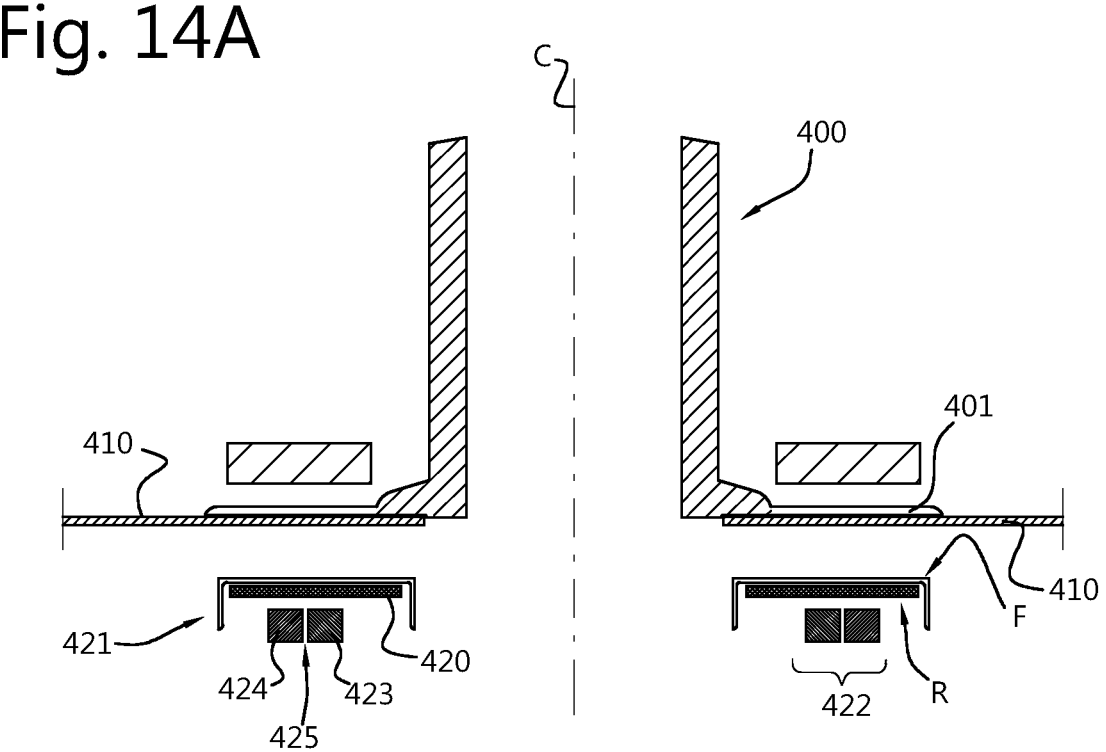

FIG. 13 schematically shows an embodiment of a sealing station for the sealing of an annular flange 401 of a plastic spout 400 and a wall 410 of heat-sealable film material. In FIG. 14A, the spout 400 and the wall 410 of heat-sealable material are shown in cross-sectional representation, wherein the annular flange 401 is sealed on top of the wall 410 of heat-sealable material.

The sealing station comprises an annular susceptor element 420 in its first jaw 421 with a circular shape, comprising electrically conductive material. The annular susceptor element 420 extends about a central axis C that is aligned perpendicular to the front surface F of the first jaw 421.

The first jaw 421 further comprises an inductor 422 at the rear side R of the annular susceptor element 420, wherein the inductor 422 is electrically insulated from the annular susceptor element 420. The inductor 422 comprises an inner inductor section 423 and an outer inductor section 424, which extend adjacent one another and concentrically with each other about the central axis C. The inner inductor section 423 and outer inductor section 424 are interconnected in series and are spaced from one another by a slit 425 that faces the annular susceptor element 420, The inner inductor section 423 and outer inductor section 424 each comprise a terminal 426, 427 for the electrical connection to a current source at one end of the inductor 422. The inner inductor section 423 and outer inductor section 424 are interconnected in series by a connecting portion 428 integral with the inductor sections 423, 424. It is shown in FIG. 13 that the connection portion 428, seen in a view along the central axis C and onto the front surface F of the first jaw 421, projects in said view outside the susceptor element 420.

Figure 14B:
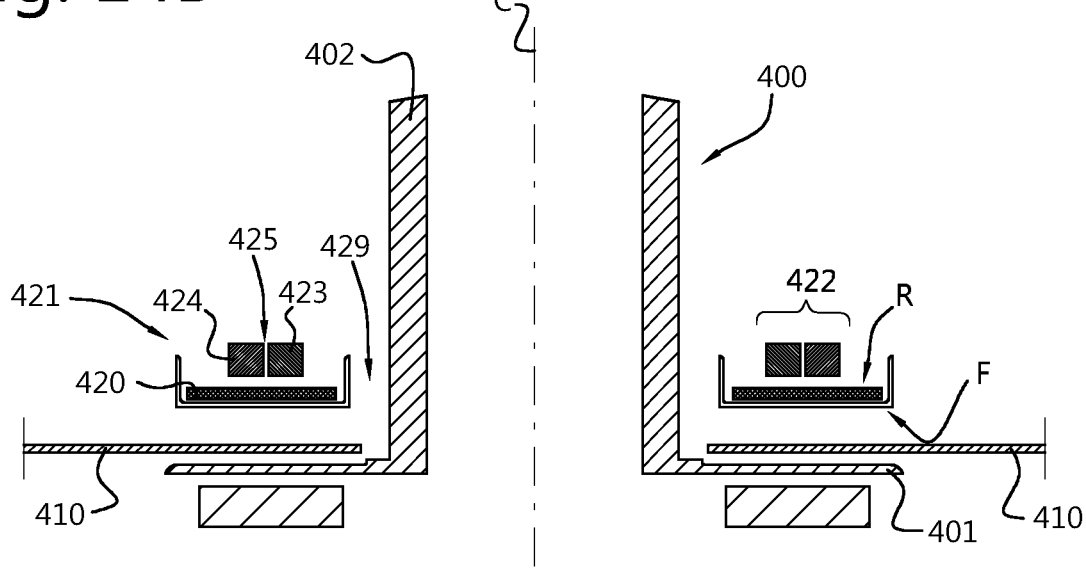

FIG. 14B represents a different embodiment, in which the wall 410 of heat-sealable material is sealed on top of the annular flange 401. In FIG. 14B, it is shown that the first jaw 421 is arranged above the wall 410 of heat-sealable material and that the neck 402 of the spout 400 protrudes through a passage 429 of the first jaw 421 that is formed by a central susceptor opening and by a central inductor opening.

Figure 15A:
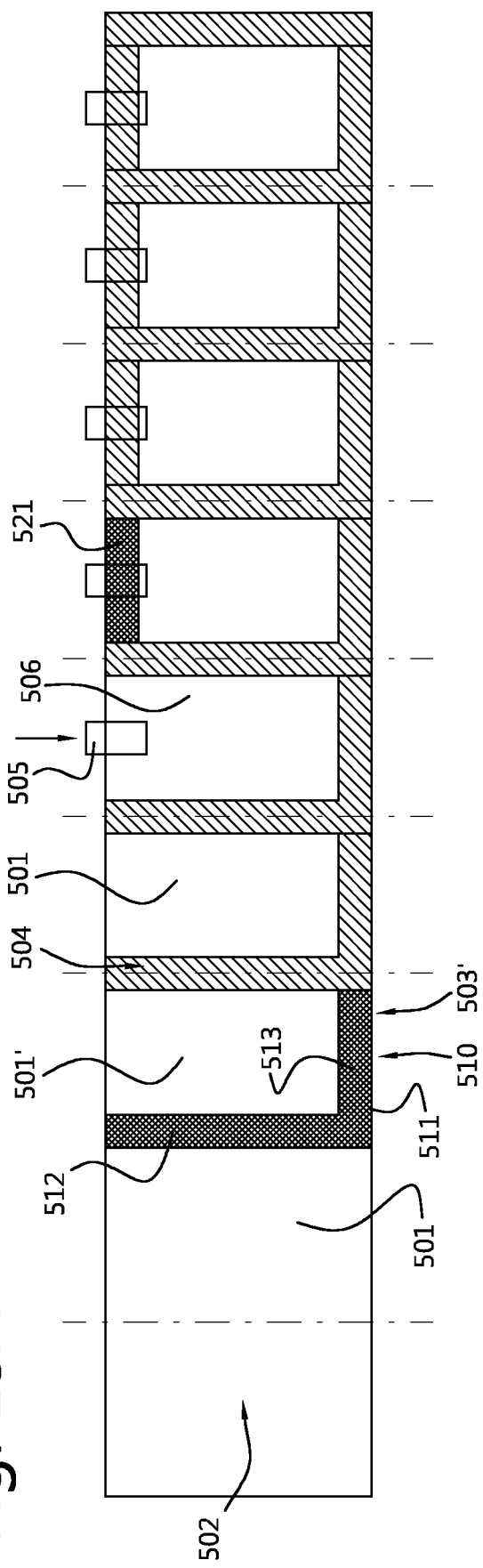

FIG. 15A illustrates schematically an embodiment of the sealing stations in a pouch production machine, of which the sealing actions are shown schematically. The machine is also known a Form-Fill-Seal (FFS) machine, in particular in the depicted embodiment a horizontal FFS machine.

The machine is configured to induction impulse heat seal pouches 501 and comprises a first sealing device 510 with a first susceptor element 511, which has a front surface that is shaped as an L. In FIG. 15A, an exemplary contour of the first susceptor element 511 is displayed. The front surface of the susceptor element is positioned against a first pouch wall 502 in its clamped position. On the opposite side of the string of interconnected pouches 501, a similar susceptor element of the second jaw is positioned against the second pouch wall 4.

During operation of the machine in a sealing cycle, as in the configuration in FIG. 15A, the first susceptor element 511 projects partially over the bottom edge region 503 of a pouch 501 and over side edge regions 504 of two adjacent interconnected pouches 501.

In particular, the first susceptor element 511 comprises first, e.g. vertical, elongated susceptor part 512 and a second, e.g. horizontal elongated susceptor part 513, which are aligned at a right angle with respect to each other. A vertical centreline of the first elongated susceptor part 512 is thereby aligned with a separation line between side edges of the two adjacent pouches 501. The first susceptor element 511 thereby projects halfway over a first pouch 501 and projects halfway over a second pouch 501'. The second, elongated susceptor part 513 extends over the bottom edge region 503' of the second pouch 501'.

The machine further comprises an inductor, not shown in FIG. 15A. The inductor is electrically insulated from the first susceptor element 511 and extends at a rear side of the susceptor element 511. In operation, an electric current source is operated to temporarily feed a high frequency alternating electric current to the inductor, thereby generating a high frequency electromagnetic field with the inductor, wherein the high frequency electromagnetic field induces alternating eddy currents in the susceptor element 511. The eddy currents generate an impulse of heat that is emitted by the susceptor element 511, which impulse of heat seal the bottom edge region 503 and side edge region 504. In this way, a heat impulse from the second elongated susceptor part 513 is configured to heat seal the bottom edge region 503 of at least one of the two adjacent interconnected pouches 501 and a heat impulse from the first elongated susceptor part 512 is configured to heat seal the side edge regions 504 of the two adjacent interconnected pouches 501.

Downstream, a spout 505 is positioned in a top edge region 506 of the pouch 501. The pouch 501 with the spout 505 then passes along towards a second sealing device with a second e.g. top susceptor element 521, where the top edge region 506 of the pouch 501 is sealed.

Figure 15B:
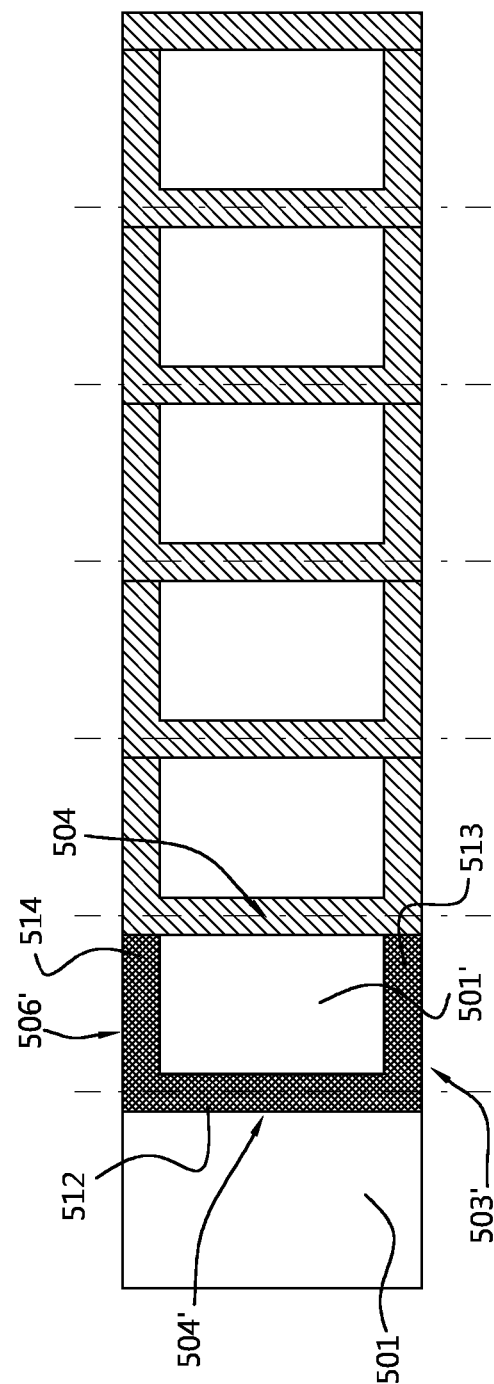

In the embodiment in FIG. 15B, the first susceptor element 511 has a front surface that is shaped as a C or as a U on its side. During use, the first susceptor element 511 projects partially over the bottom edge region 503 of a pouch 501, over side edge regions 504 of two adjacent interconnected pouches 501 and over the top edge region 506 of the pouch 501.

In particular, the first susceptor element 511 comprises first, e.g. vertical, elongated susceptor part 512, a second, e.g. horizontal elongated susceptor part 513 and a third, e.g. horizontal elongated susceptor part 514. The first elongated susceptor part 512 is aligned at a right angle with respect to the second elongated susceptor part 513 and the third elongated susceptor part 514 is aligned at a right angle with respect to the second elongated susceptor part 513 as well. A vertical centreline of the first elongated susceptor part 512 is thereby aligned with a separation line between side edges of the two adjacent pouches 501. The first susceptor element 511 thereby projects halfway over a first pouch 501 and projects halfway over a second pouch 501'. The second, elongated susceptor part 513 extends over the bottom edge region 503' of the second pouch 501'. The third, elongated susceptor part 514 extends over the top edge region 506' of the second pouch 501'. In this way, a heat impulse from the second elongated susceptor part 513 is configured to heat seal the bottom edge region 503 of at least one of the two adjacent interconnected pouches 501, a heat impulse from the first elongated susceptor part 512 is configured to heat seal the side edge regions 504 of the two adjacent interconnected pouches 501 and a heat impulse from the third elongated susceptor part 514 is configured to heat seal the top edge region 506 of at least one of the two adjacent interconnected pouches 501.

The invention claimed is:

1. A sealing station configured to create a sealed seam by heat sealing walls of heat-sealable material onto one another, wherein the sealing station comprises:
    an impulse sealing device comprising a first jaw and a second jaw,
    an actuator device configured to move the first and second jaws relative to one another between an opened position and a clamped position,
    a cooling device configured to cool at least one of the first and second jaws,
    wherein the first jaw has a first front surface configured to contact an elongated seam region of a respective first wall made from heat-sealable material,
    wherein the second jaw has a second front surface configured to contact an elongated seam region of a respective second wall made from heat-sealable material,
    wherein at least one of the first and second jaws comprises at the respective front surface thereof an impulse heatable member that extends along the respective front surface and that is covered by a heat-resistant non-stick covering,
    wherein the sealing station is configured to perform an impulse sealing cycle, wherein the actuator device is configured to bring the first and second jaws into the clamped position, so that the elongated seam regions of the respective first and second walls are clamped against one another by the first and second jaws, and wherein the sealing station is configured to, in the clamped position, temporarily energize each impulse heatable member so as to generate an impulse of heat that is emitted by each impulse heatable member, which impulse of heat seals the elongated seam regions of the respective first and second walls onto each other, wherein at least one of the first and second jaws is cooled by the cooling device after termination of energizing of the impulse heatable member, and wherein the actuator device is configured to move the first and second jaws into the opened position after the impulse heatable member has cooled down,
    wherein each impulse heatable member is a susceptor element embodied as a strip of electrically conductive material, said susceptor element having a rear side facing away from the first front surface of the first jaw or the second front surface of the second jaw,
    and wherein said at least one of the first and second jaws comprising said impulse heatable member further comprises, at the rear side of the susceptor element, an inductor that is electrically insulated from the susceptor element, said inductor having multiple elongated inductor sections that each have a length extending in a direction along the first front surface of the first jaw or the second front surface of the second jaw,
    wherein the multiple elongated inductor sections are parallel to one another and spaced from one another by a slit,
    and wherein the sealing station comprises a high frequency electric current source, which is connected to the inductor,
    wherein the sealing station is configured so that, in the impulse sealing cycle, the high frequency electric current source is operated to temporarily feed a high frequency electric current to the inductor, thereby generating a high frequency electromagnetic field with the inductor, wherein the high frequency electromagnetic field induces eddy currents in the susceptor element generating an impulse of heat that is emitted by the susceptor element, which impulse of heat seals the elongated seam regions of the respective first and second walls to each other.

2. The sealing station according to claim 1, wherein each elongated inductor section is a solid cross-section metal inductor section having a constant cross-section over the length thereof.

3. The sealing station according to claim 1, wherein each elongated inductor section has, seen in a top view onto the first jaw or the second jaw, a shape corresponding to the first front surface of the first jaw or the second front surface of the second jaw and maintains a uniform distance between the susceptor element and the elongated inductor section.

4. The sealing station according to claim 1, wherein the slit spacing parallel elongated inductor sections from one another is an air slit or a slit filled with electrically insulating material.

5. The sealing station according to claim 1, wherein said slit between neighbouring inductor sections has a width between 0.01 mm and 5 mm.

6. The sealing station according to claim 1, wherein the susceptor element is embodied as one strip that extends over the slit between the elongated inductor sections and overlaps in said view with each of the elongated inductor sections.

7. The sealing station according to claim 1, wherein the inductor of the first or the second jaw is embodied so that in a pair of parallel inductor sections spaced by said slit, the high frequency electric current flows in opposite directions through the elongated inductor sections.

8. The sealing station according to claim 1, wherein each elongated inductor section has a thickness of between 1.0 mm and 4.0 mm, seen perpendicular to the first front surface of the first jaw or the second front surface of the second jaw.

9. The sealing station according to claim 1, wherein at least one of the first and second jaws provided with the inductor is further provided with at least one cooling fluid duct that extends along at least one of the inductor sections.

10. The sealing station according to claim 1, wherein the susceptor element is made of metal material.

11. The sealing station according to claim 1, wherein the susceptor element is embodied as a strip having opposed front and rear main faces that define a thickness of the strip between them.

12. The sealing station according to claim 11, wherein the susceptor element has a thickness of between 0.01 mm and 5 mm.

13. The sealing station according to claim 11, wherein the first jaw or the second jaw is provided with the susceptor element embodied as the strip, having a width of the strip between 3 and 40 millimetres and a thickness of between 0.08 and 0.8 mm.

14. The sealing station according to claim 1, wherein said at least one of the first and second jaws comprising said impulse heatable member further is provided with a resilient backing layer behind the susceptor element.

15. The sealing station according to claim 1, wherein a spacing between the rear of the susceptor element and the inductor sections is at a minimum 0.025 mm and at a maximum 3.0 mm.

16. The sealing station according to claim 1, wherein a spacing between the first front surface of the first jaw or the second front surface of the second jaw and the susceptor element is at a minimum 0.025 mm and at a maximum 2.0 mm.

17. The sealing station according to claim 1, wherein the sealing station is configured to provide a heat impulse with the susceptor element of between at least 150° C. and at most 500° C. measured on the susceptor element.

18. The sealing station according to claim 1, wherein duration of the impulse of heat is between 10 milliseconds and 1000 milliseconds.

19. The sealing station according to claim 1, wherein the impulse sealing cycle includes a clamped cooling phase directly following the impulse of heat during which the first and second jaws are maintained the clamped position.

20. The sealing station according to claim 1, wherein the sealing station is configured to create a bottom gusset seal in a W-shaped bottom gusset pouch, wherein the impulse sealing device is embodied to establish a seam between a first pouch wall made from heat-sealable film material and a first gusset portion that is directly inward thereof and a seam between an opposed second pouch wall made from heat-sealable film material and a second gusset portion that is directly inward thereof, said first and second gusset portions being interconnected via an inner fold line.

21. A production machine for the production of collapsible pouches, said collapsible pouches each having first and second walls made from heat-sealable film material, wherein the production machine comprises the sealing station according to claim 1 that is configured to heat seal the first and second walls onto one another to create a seam of the collapsible pouch.

22. The production machine of claim 21, wherein the sealing station is configured to establish a side seam of the pouch.

23. A sealing station configured to heat seal a wall made from heat-sealable film material onto an annular attachment flange of a plastic spout made from heat-sealable material to create a sealed joint between the annular attachment flange and the wall,
wherein the sealing station comprises:
an impulse sealing device comprising a first jaw and a second jaw,
an actuator device configured to move the first and second jaws relative to one another between an opened position and a clamped position,
a cooling device configured to cool at least one of the first and second jaws,
wherein the first jaw has a first front surface configured to contact an annular seal region of the wall made from heat-sealable film material,
wherein the second jaw has a second front surface configured to contact an annular seal region of the annular attachment flange of the plastic spout made from heat-sealable material,
wherein the first jaw comprises at the first front surface an impulse heatable member that extends along the first front surface and that is covered by a heat-resistant non-stick covering,
wherein the sealing station is configured to perform an impulse sealing cycle, wherein the actuator device is configured to bring the first and second jaws into the clamped position, so that the annular seal regions of the wall and the annular attachment flange are clamped against one another by the first and second jaws, and wherein the sealing station is configured to, in the clamped position, temporarily energize each impulse heatable member so as to generate an impulse of heat that is emitted by each heatable member, which impulse of heat seals the annular seal regions of the wall and the annular attachment flange to each other,
wherein at least one of the first and second jaws is cooled by the cooling device after termination of energizing of the impulse heatable member, and wherein the actuator device is configured to move the first and second jaws into the opened position after the impulse heatable member has cooled down, wherein the impulse heatable member of the first jaw is an annular susceptor element of electrically conductive material, said annular susceptor element extending about a central axis that is perpendicular to the first front surface and having a rear side facing away from the first front surface, and wherein the first jaw comprises an inductor at the rear side of the annular susceptor element, wherein the inductor is electrically insulated from the annular susceptor element, wherein the inductor comprises an inner inductor section and an outer inductor section, which extend adjacent one another and concentrically about the central axis, spaced from one another by a slit, wherein the inner and outer inductor sections are interconnected in series, and wherein the sealing station comprises a high frequency electric current source, which is connected to the inductor, wherein the sealing station is configured so that, in the impulse sealing cycle, the high frequency electric current source is operated to temporarily feed a high frequency electric current to the inductor, which flows through the inner and outer inductor sections in opposite directions, thereby generating a high frequency electromagnetic field with the inductor, wherein the high frequency electromagnetic field induces eddy currents in the annular susceptor element generating an impulse of heat that is emitted by the annular susceptor element, which impulse of heat seals the annular seal regions of the wall and the annular attachment flange to each other.

24. The sealing station according to claim 23, wherein the annular susceptor element has a circular shape.

25. The sealing station according to claim 23, wherein the annular susceptor element has a rectangular shape.

* * * * *